United States Patent
Byrd Vallieres de St. Real et al.

(10) Patent No.: US 9,137,321 B2
(45) Date of Patent: Sep. 15, 2015

(54) PAIRING USERS WITH SOCIAL MEDIA COMMUNITIES

(71) Applicant: Citrix Systems, Inc., Fort Lauderdale, FL (US)

(72) Inventors: Sarah Burzina Anne Byrd Vallieres de St. Real, Medford, MA (US); Deane Smith, Fitchburg, MA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 376 days.

(21) Appl. No.: 13/836,884

(22) Filed: Mar. 15, 2013

(65) Prior Publication Data

US 2014/0280551 A1    Sep. 18, 2014

(51) Int. Cl.
G06F 15/16 (2006.01)
G06F 15/173 (2006.01)
H04L 29/08 (2006.01)
G06Q 10/10 (2012.01)
G06Q 50/00 (2012.01)

(52) U.S. Cl.
CPC .............. *H04L 67/22* (2013.01); *G06Q 10/101* (2013.01); *G06Q 50/01* (2013.01); *H04L 67/12* (2013.01)

(58) Field of Classification Search
CPC ....... G06Q 50/01; H04L 67/306; H04L 51/32
See application file for complete search history.

(56) References Cited

U.S. PATENT DOCUMENTS

| | | | |
|---|---|---|---|
| 6,631,412 B1 * | 10/2003 | Glasser et al. | 709/224 |
| 8,903,909 B1 * | 12/2014 | Marra et al. | 709/204 |
| 2007/0005750 A1 * | 1/2007 | Lunt et al. | 709/223 |
| 2007/0174389 A1 * | 7/2007 | Armstrong et al. | 709/204 |
| 2008/0201733 A1 * | 8/2008 | Ertugrul et al. | 725/32 |
| 2009/0070412 A1 * | 3/2009 | D'Angelo et al. | 709/203 |
| 2011/0289433 A1 * | 11/2011 | Whalin et al. | 715/753 |
| 2012/0059767 A1 * | 3/2012 | Uthmann | 705/319 |
| 2013/0073473 A1 * | 3/2013 | Heath | 705/319 |

OTHER PUBLICATIONS

Buzzient, Enterprise Social CRM, "Integrate and operationalize social media within your existing Enterprise Apps," www.buzzient.com, printed Feb. 14, 2013, p. 1.

Citrix—Best-in-class Virtualization, Networking and Cloud Computing Solutions, "Explore Citrix Products," www.citrix.com/products.html?ntref=hp_nav_us, printed Feb. 19, 2013, p. 1.

(Continued)

*Primary Examiner* — Peling Shaw
(74) *Attorney, Agent, or Firm* — Banner & Witcoff, Ltd.

(57) ABSTRACT

Systems and methods that integrate social media applications having social media communities of like-minded users with other applications, such as enterprise applications, are described herein. A user may join one or more of the social media communities based on a variety of factors, including applications the user uses or plans to use, user type (e.g., end-user, administrator, etc.), the user's level of expertise, and/or the type of activities that the user plans to perform in one or more applications. A user's actions within or using one or more applications may be monitored. In response to detecting performance of a monitored action, a description of the user's action may be published to other users in the social media community, the user may be paired with one or more social media communities, and/or recommendations for resources related to the detected action may be provided to the user. Recommendations may also be provided based on posts made by the user in the social media community.

20 Claims, 26 Drawing Sheets

(56) References Cited

OTHER PUBLICATIONS

Citrix—CitrixGoToAssist, "Remote support, service desk management and IT monitoring," www.citrix.com/products/gotoassist/overview.html?ntref=prod_cat, printed Feb. 19, 2013, pp. 1-2.
Citrix—CitrixGoToMeeting, "Online Meetings Made Easy," www.citrix.com/products/gotomeeting/overview.html?ntref=prod_cat, printed Feb. 19, 2013, pp. 1-2.
Citrix—GoToMyPC by Citrix, "Access Your Mac or PC from Anywhere," www.citrix.com/products/gotomypc/overview.html?ntref=prod_cat, printed Feb. 19, 2013, pp. 1-2.
Citrix—CitrixGoToTraining, "Online Training Made Easy," www.citrix.com/products/gototraining/overview.html?ntref=prod_cat, printed Feb. 19, 2013, pp. 1-2.
Citrix—GoToWebinar : Webinars & Web Events Made Easy, "Webinars Made Easy," www.citrix.com/products/gotowebinar/overview.html?ntref=prod_cat, printed Feb. 19, 2013, pp. 1-2.
Citrix—HiDef Corporate, "Audio Conferencing Made Easy," www.citrix.com/products/hidefcorporate/overview.html?ntref=prod_cat, printed Feb. 19, 2013, pp. 1-2.
Citrix—CitrixPodio—Get work done your way—with anyone, anywhere, "Work the way you want to," www.citrix.com/products/podio/overview.html?ntref=prod_cat, printed Feb. 19, 2013, pp. 1-2.
Citrix—ShareFile—What's New—StorageZones, "StorageZones—Choose where data is stored," www.citrix.com/products/sharefile/whats-new/storagezones.html?ntref=prod_cat, printed Feb. 19, 2013, p. 1.
Citrix—ShareFile—Share data securely, "Deliver a secure follow-me data service," www.citrix.com/products/sharefile/overview.html?ntref=prod_cat, printed Feb. 19, 2013, p. 1.
GoToMeeting—Easy Web Conferencing & Online Meeting Tools, "Online Meetings Made Easy," www.gotomeeting.com/fec/online_meeting, printed Feb. 18, 2013, pp. 1-3.
eHarmony, "eHarmony #1 Trusted Singles Online Dating Site—More than Personals," www.eharmony.com, printed Feb. 14, 2013, pp. 1-3.
Facebook, https://www.facebook.com/facebook, printed Feb. 19, 2013, pp. 1-3.
Google Google+, https://accounts.google.com/ServiceLogin?service=oz&continue=https://plus.google.com/?gpsrc%3Dgplp0&hl=en-US, printed Feb. 20, 2013, p. 1.
jive, Jive Software, Social Collaboration for Social Business, "Want to increase revenue 2-4%? Ask Jive Customers How," www.jivesoftware.com, printed Feb. 14, 2013, pp. 1-2.
How Match.com Online Dating Works, www.match.com/howitworks/index.aspx?lid=4, printed Feb. 14, 2013, p. 1.
Windows, Windows 7 system requirements—Microsoft Windows, "Windows 7 system requirements," windows.microsoft.com/en-US/windows7/products/system-requirements, printed Feb. 14, 2013, pp. 1-2.
Windows, Install, upgrade, & activate—Microsoft Windows Help, "Install, upgrade, & activate," windows.microsoft.com/en-US/windows/install-upgrade-activate-help#install-upgrade-activate-help=windows-7&v2h=win7tab1&v3h=winvistatab1, printed Feb. 14, 2013, pp. 1-2.
Windows, Support—Microsoft Windows Help, windows.microsoft.com/en-US/windows/support, printed Feb. 14, 2013, pp. 1-2.
Yammer, "The First and Most Powerful Enterprise Social Network," © 2013 Yammer, pp. 1-2.

* cited by examiner

PAIRING USERS WITH SOCIAL MEDIA COMMUNITIES

FIELD

Aspects described herein relate to computer systems and integration of social media applications with other applications. More specifically, aspects described herein relate to pairing users with social media communities, monitoring users' activities in one or more applications, displaying users' activities in social media communities, generating resource suggestions for users, and/or re-pairing users with social media communities.

BACKGROUND

Social media applications have grown in popularity in recent years. Individuals that use the same social media application or interface, such as FACEBOOK®, may interact with one another by posting status messages or exchanging information. These posts may be made public to all members of the social media application or to a subset of the members, such as a user's friends or acquaintances. On the other hand, enterprise, productivity, and other types of applications traditionally do not have the flexibility of social media applications for collaboration and sharing information to pertinent groups of individuals. Accordingly, there is an insufficient functional connection between enterprise/productivity/other types of applications and social media applications, and there exists an ever present need to improve the integration among social media applications and other types of applications.

SUMMARY

In light of the foregoing background, the following presents a simplified summary of the present disclosure in order to provide a basic understanding of some aspects described herein. This summary is not an extensive overview, and is not intended to identify key or critical elements or to delineate the scope of the claims. The following summary merely presents various described aspects in a simplified form as a prelude to the more detailed description provided below.

In order to address the above shortcomings and additional benefits that will be realized upon reading the disclosure, aspects herein describe a method, one or more non-transitory computer-readable media storing computer-readable instructions that, when executed by a computing device, cause the computing device to perform a method, and/or a device comprising a processor and memory storing computer-readable instructions that, when executed by the processor, cause the device to perform a method.

In some embodiments, a method of pairing a user to a social media community may include initiating a monitoring client to monitor user activity in an application and detecting, by the monitoring client, a user action taken in the application. The monitoring client may comprise a plug-in to the application. A computing device may determine a first social media community corresponding to the detected user action, wherein the first social media community may be classified among a plurality of social media communities. The user may be paired with the first social media community corresponding to the detected user action.

In some aspects, detecting the user action may comprise determining the presence of an identifier assigned to the user action, and determining the first social media community may comprise comparing the identifier to a data mapping table for the application, wherein the data mapping table may be configured to correlate the identifier with the user action. Additionally or alternatively, determining the first social media community may comprise determining that the first social media community does not exist and in response to determining that the first social media community does not exist, creating the first social media community. Furthermore, pairing the user with the first social media community may comprise pairing the user with the created first social media community.

In some embodiments, the user may be paired with a second social media community different from the first social media community, and the method may further comprise maintaining the user's pairing with the second social media community while pairing the user with the first social media community. Additionally or alternatively, pairing the user with the first social media community may comprise switching the user from a second social media community to the first social media community. The second social media community may be different from the first social media community. Furthermore, prior to pairing the user with the first social media community, the method may further comprise generating a plurality of community pairing display windows configured to navigate the user to join at least one of the plurality of social media communities, receiving at least one selection of an application, application type, user type, user level, and activity type desired by the user, determining the second social media community based on the at least one selection, and pairing the user with the second social media community.

If the second social media community does not exist, the second social media community may be created. Accordingly, pairing the user with the second social media community may comprise pairing the user with the created second social media community. Additionally or alternatively, receiving the at least one selection may comprise receiving at least two selections of an application, application type, user type, user level, and activity type. In response to determining that the second social media community does not exist, the user may be paired with a third social media community based on at least one of the user's selections matching the third social media community and at least one of the user's selections not matching the third social media community.

In some embodiments, a method of displaying user actions in a social media community may comprise monitoring actions performed by a user in an application and in response to detecting a user action assigned a predefined identifier, retrieving, from a database, at least one keyword associated with the predefined identifier. The method may further include initiating a monitoring client plug-in for the application, and the monitoring step may be performed by the monitoring client plug-in. A computing device may generate a textual description of the user action, which may comprise the at least one keyword and an identifier for the user. The textual description may be displayed in a discussion feed window of a social media community. The social media community may comprise a plurality of users that have performed the user action assigned the predefined identifier. Furthermore, the textual description of the user action may comprise at least one of the following: the name of the application and the time of the detected user action. Additionally, the textual description of the user action may comprise at least one of the following: a link to request an online meeting with the user and a link to send a private message to the user.

In some aspects, the method may include monitoring actions performed by the user in a plurality of applications. These applications may include at least one enterprise application. A plurality of actions performed by the user in the plurality of applications may be displayed in a discussion feed. The method may further comprise generating, by a computing device, searches in one or more resources based on the predefined identifier. Generating the searches may comprise generating one or more search strings based on a plurality of keywords associated with the predefined identifier. The plurality of keywords may include the keyword displayed in the textual description. Results of the searches may be displayed in a window of the social media community.

In some embodiments, a method of generating suggestions based on user activity in an application may comprise monitoring, by a computing device, keywords inputted for display in a discussion feed window of a social media community. It may be determined that at least one of the inputted keywords corresponds to at least one application activity stored in a data mapping table. The method may further include generating searches in one or more resources based on the at least one application activity. Generating the searches may comprise generating one or more search strings based on a plurality of keywords associated with the at least one application activity. Additionally or alternatively, generating the searches may comprise searching at least one indexed help page corresponding to the at least one application activity. Results of the searches may be displayed in a window of the social media community.

These and other aspects will be readily apparent upon reading the detailed description below.

BRIEF DESCRIPTION OF THE DRAWINGS

Figure 1:
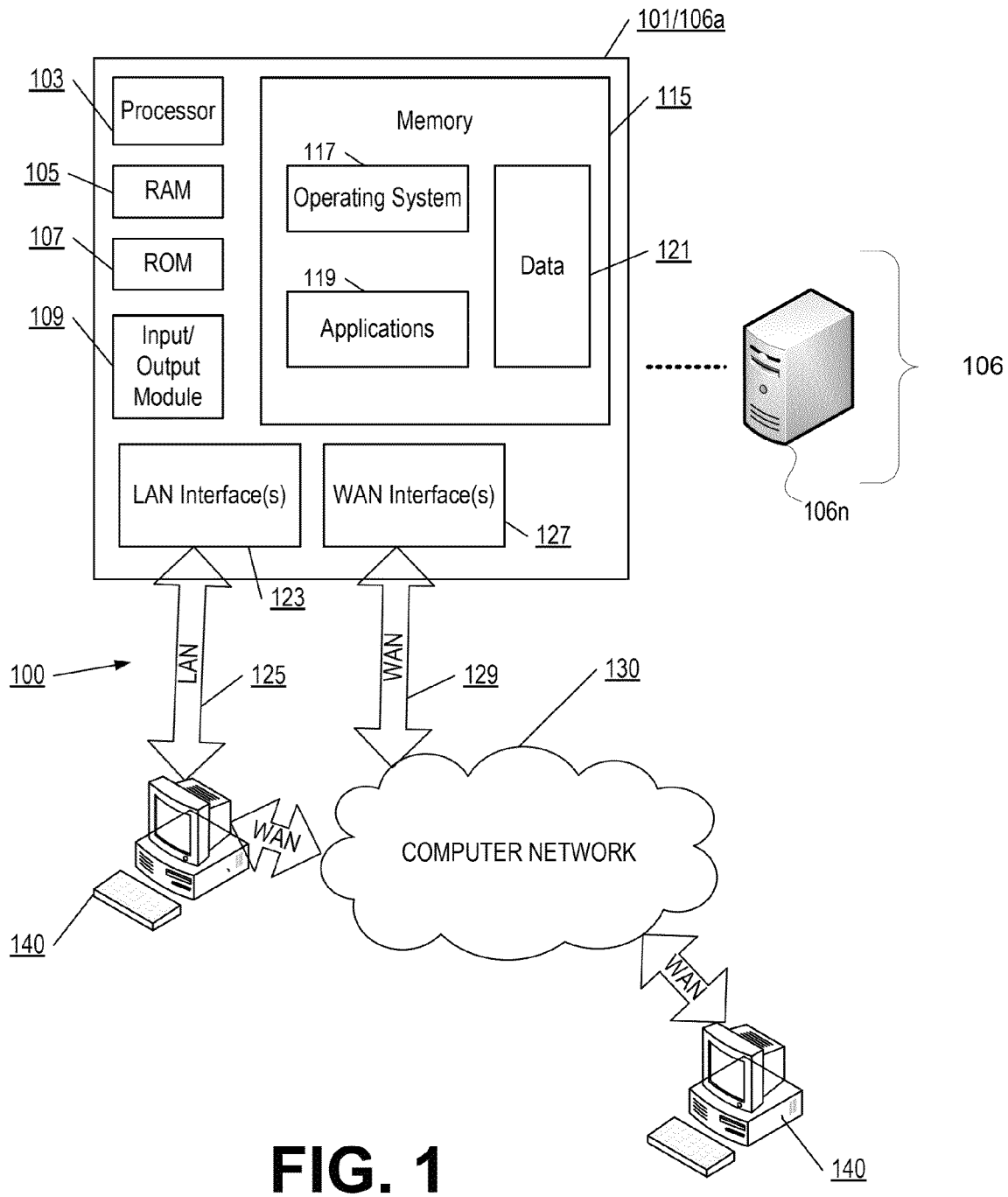

Having thus described aspects of the disclosure in general terms, reference will now be made to the accompanying drawings, which are not necessarily drawn to scale, and wherein:

FIG. 1 illustrates an example operating environment in which various aspects of the disclosure may be implemented.

Figure 2:
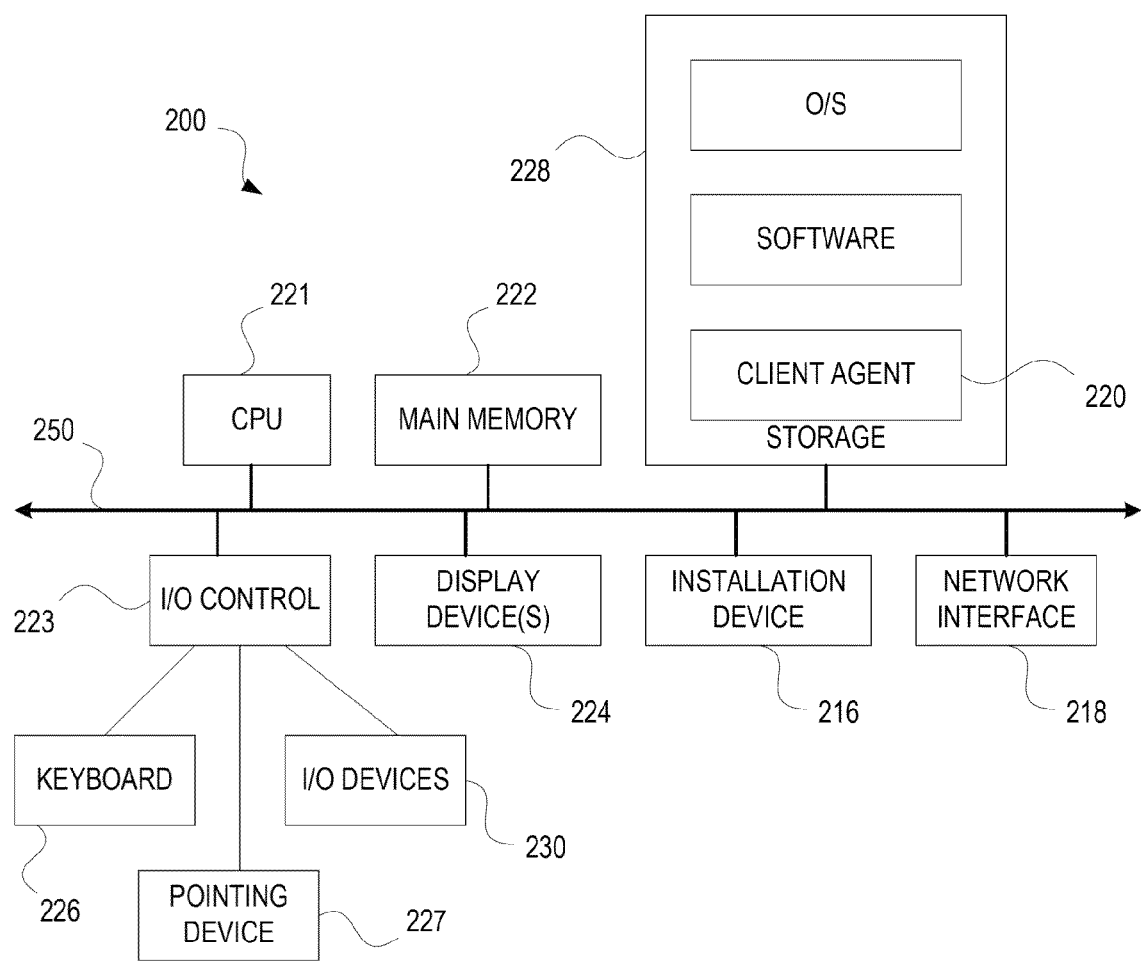

FIG. 2 illustrates a device that may be used in accordance with one or more illustrative aspects described herein.

Figure 3:
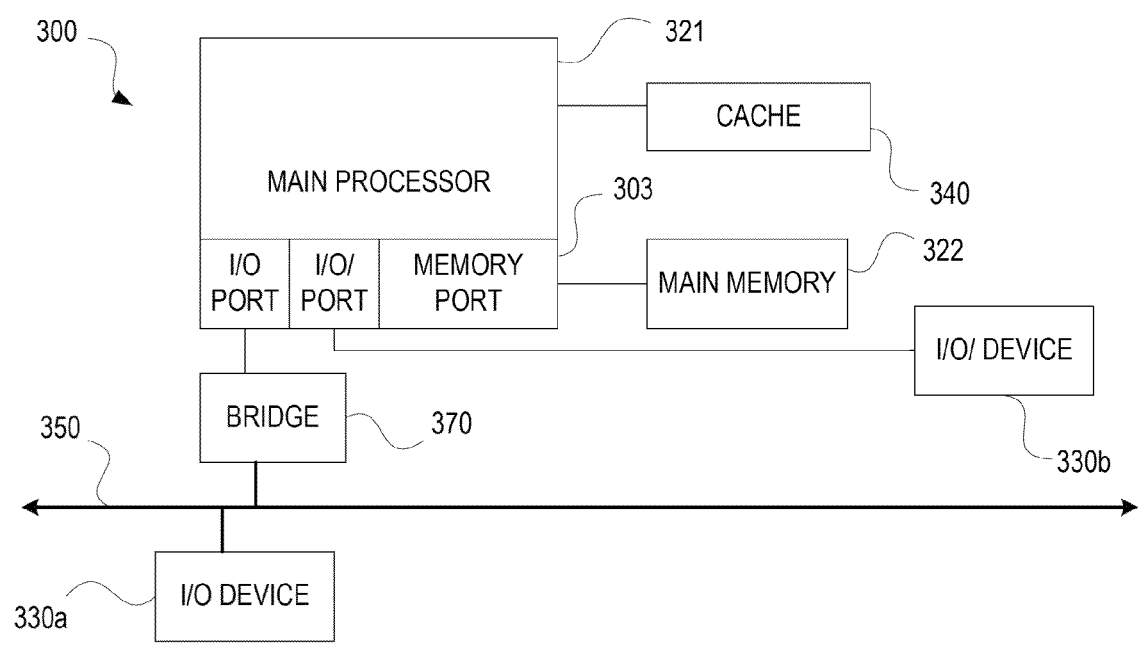

FIG. 3 illustrates a device that may be used in accordance with one or more illustrative aspects described herein.

Figure 4:
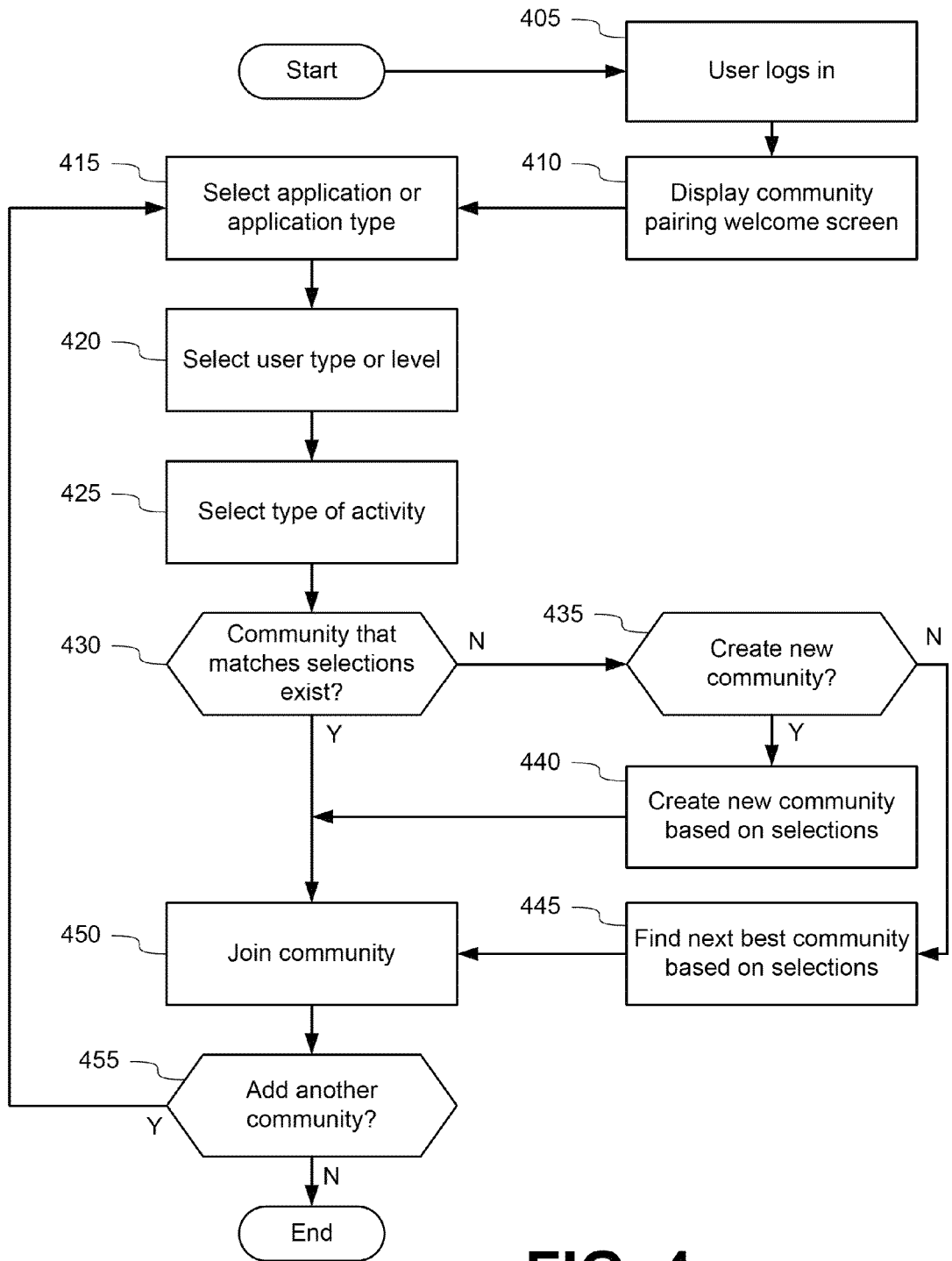

FIG. 4 illustrates an example method of pairing a user with a social media community in accordance with one or more illustrative aspects described herein.

Figure 5:
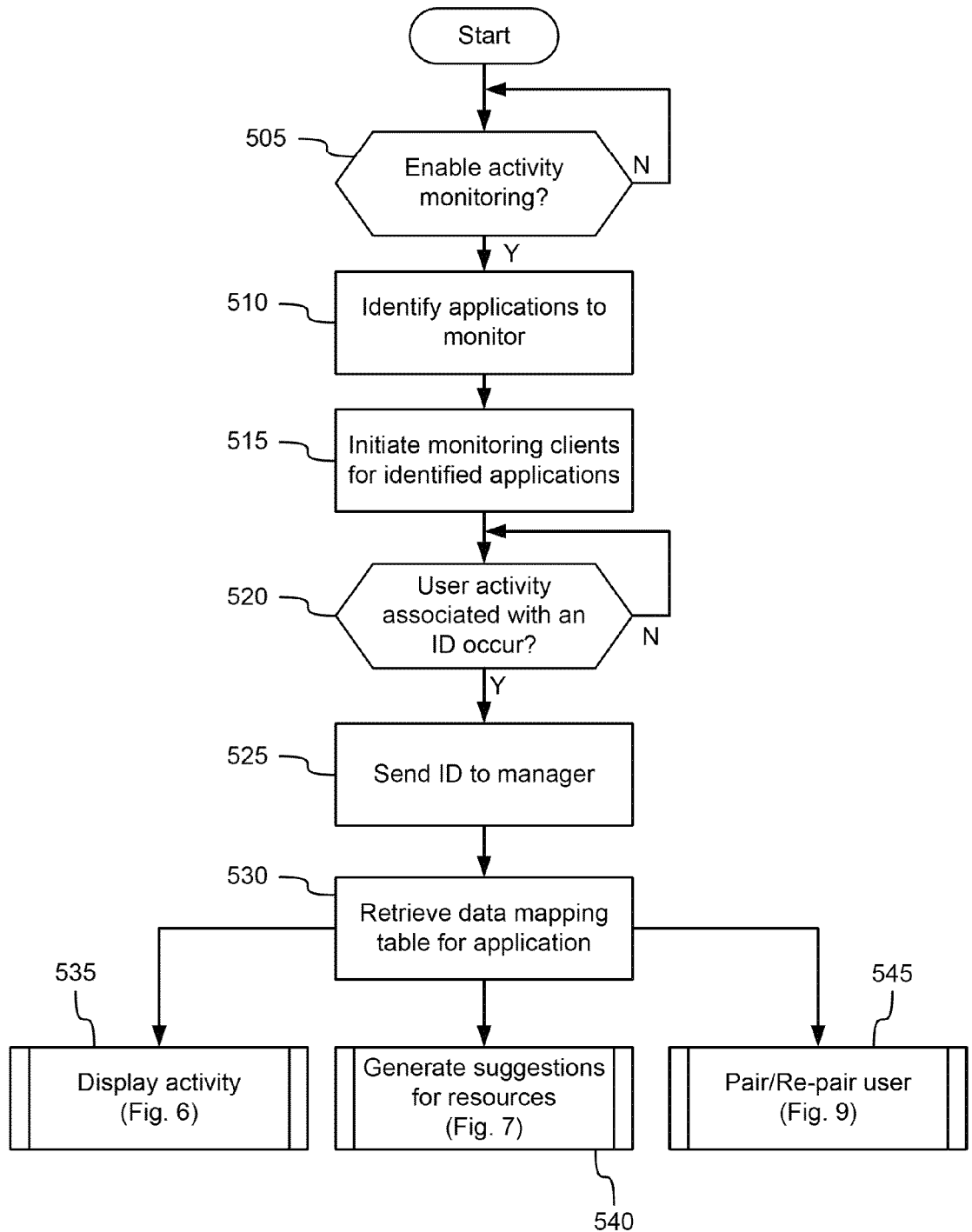

FIG. 5 illustrates an example method of monitoring a user's activity in an application in accordance with one or more illustrative aspects described herein.

Figure 6:
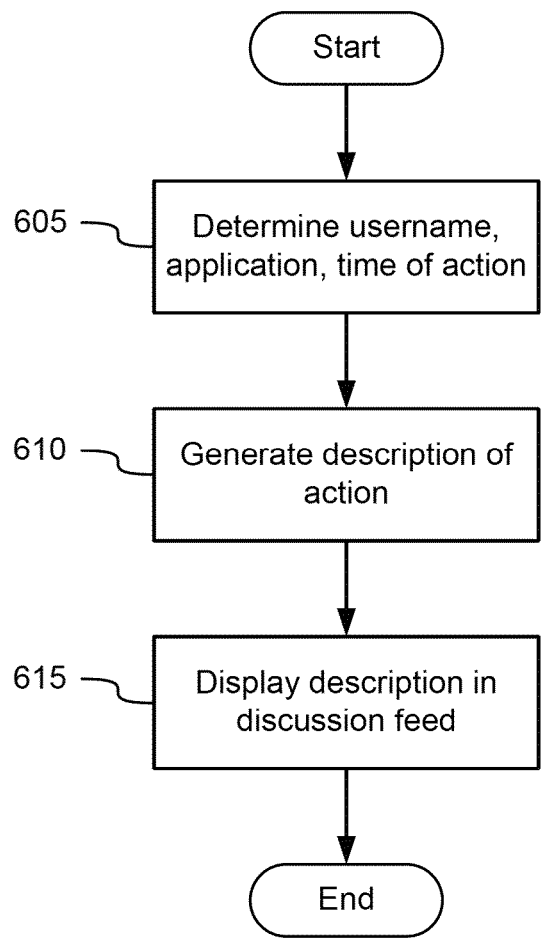

FIG. 6 illustrates an example method of generating textual descriptions of user actions in accordance with one or more illustrative aspects described herein.

Figure 7:
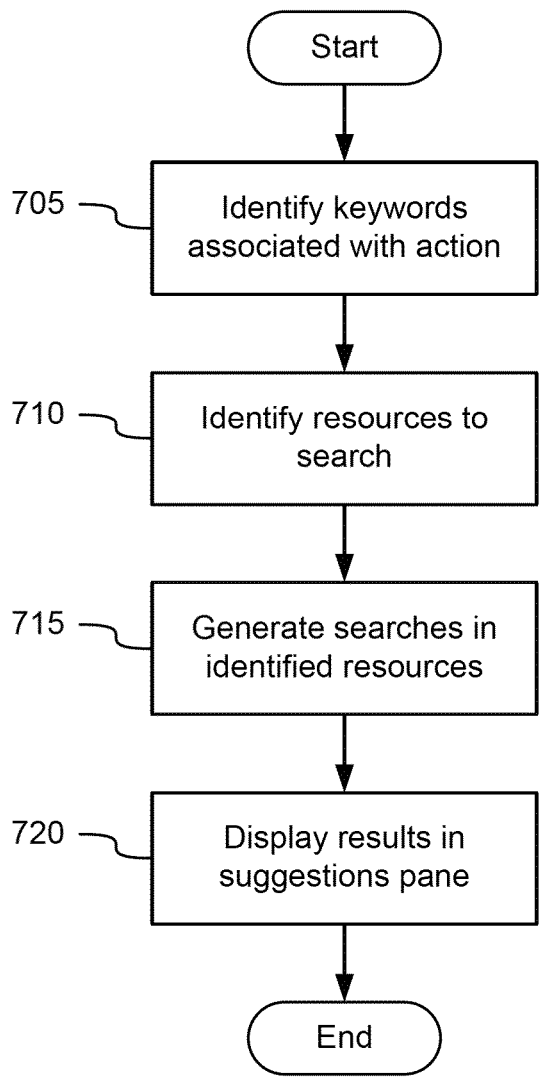

FIG. 7 illustrates an example method of searching resources for information based on user activity in an application in accordance with one or more illustrative aspects described herein.

Figure 8:
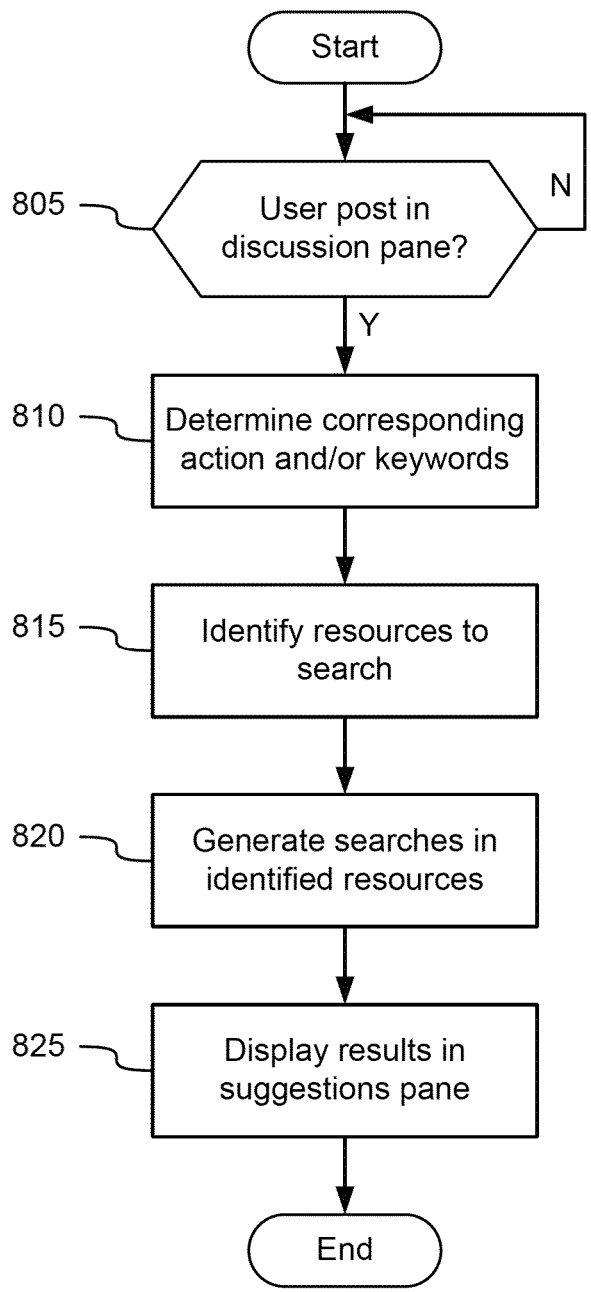

FIG. 8 illustrates an example method of searching resources for information based on user discussion posts in accordance with one or more illustrative aspects described herein.

Figure 9:
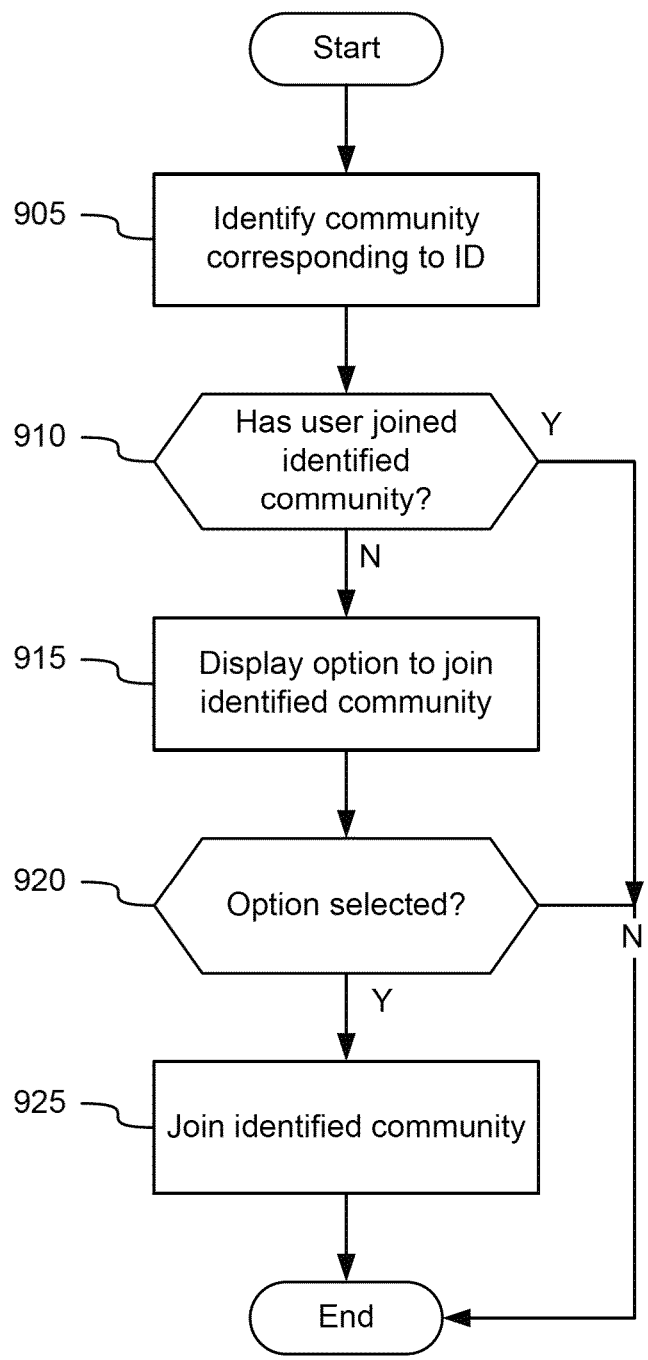

FIG. 9 illustrates an example method of pairing a user with a social media community based on user activity in accordance with one or more illustrative aspects described herein.

Figure 10:
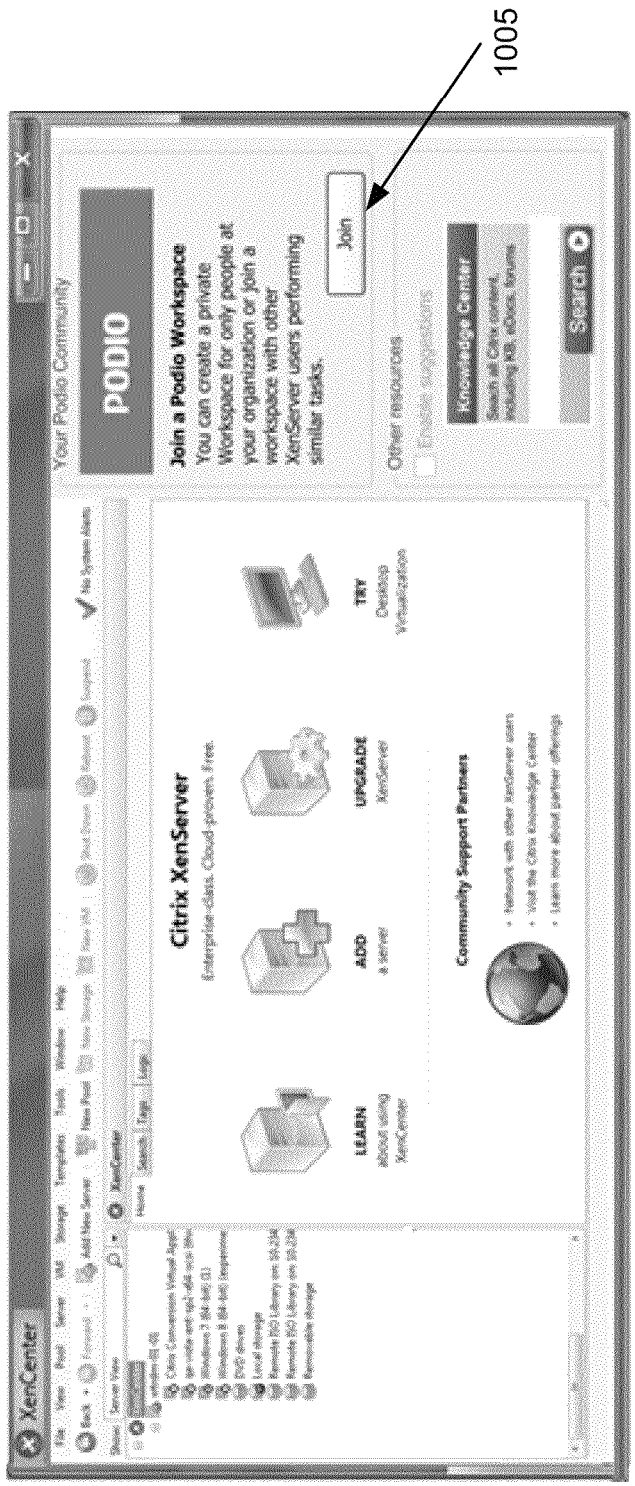

FIG. 10 illustrates an example graphical user interface for initiating a social media community in accordance with one or more illustrative aspects described herein.

FIGS. 11-16 illustrate example graphical user interfaces for joining a social media community in accordance with one or more illustrative aspects described herein.

Figure 17:
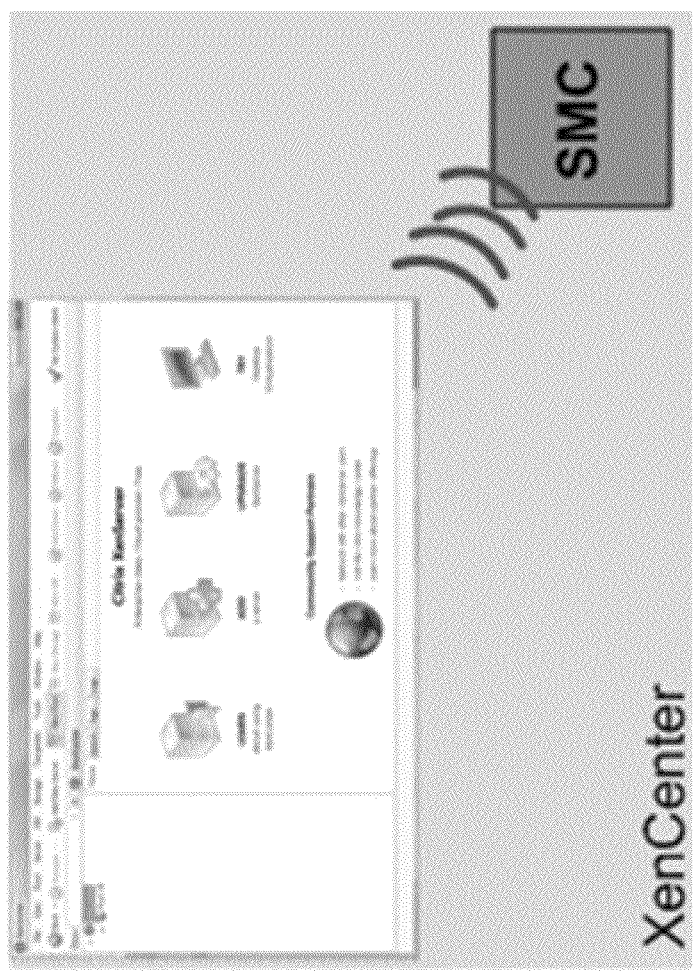
Figure 18:
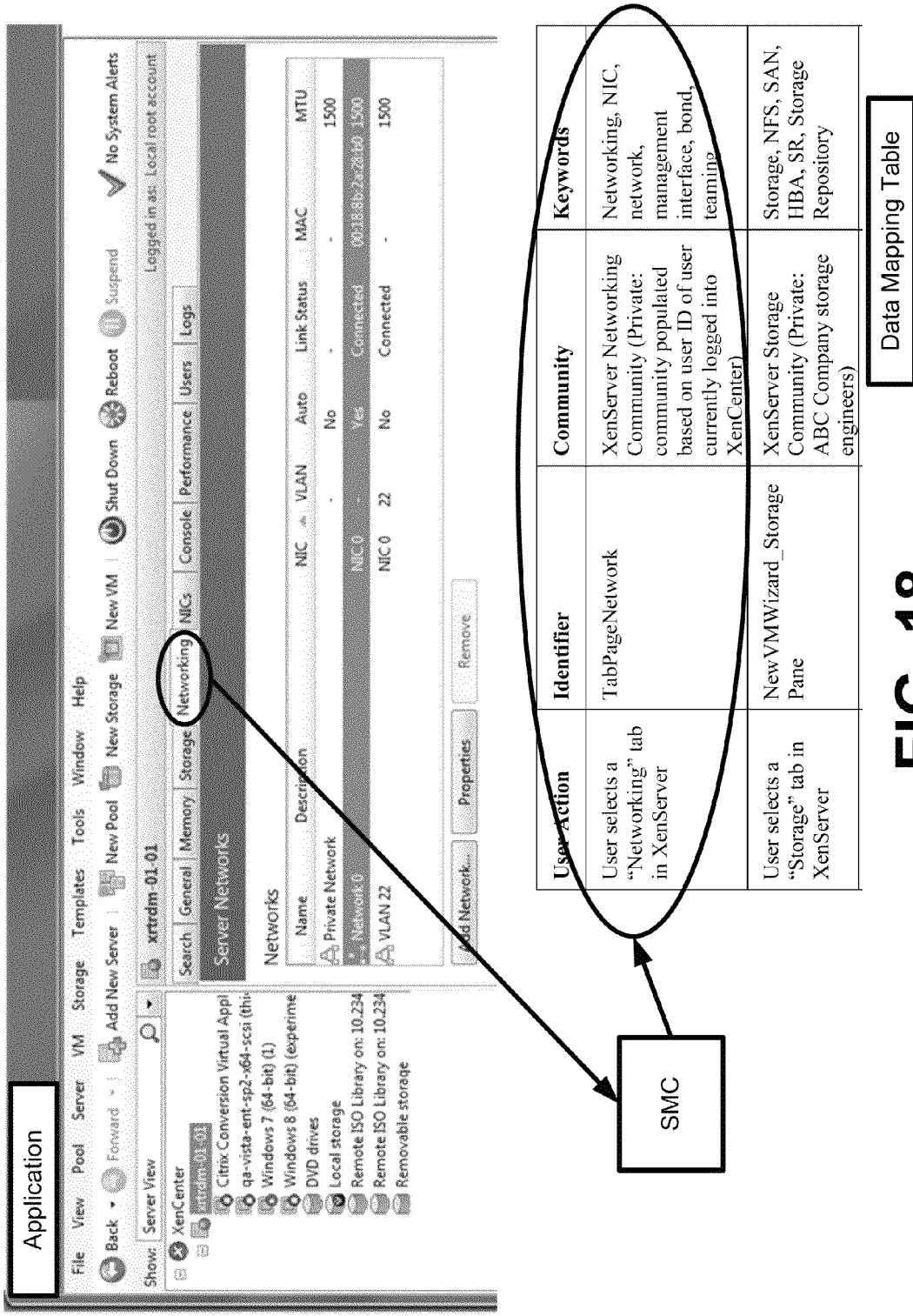

FIGS. 17 and 18 illustrate examples of monitoring user activity in one or more applications in accordance with one or more illustrative aspects described herein.

Figure 19:
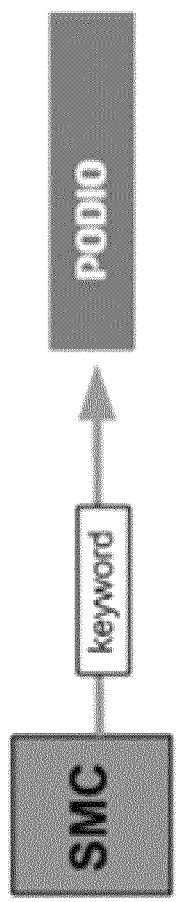

FIG. 19 illustrates an example of generating a textual description of user activity or generating a search based on user activity in accordance with one or more illustrative aspects described herein.

Figure 20:
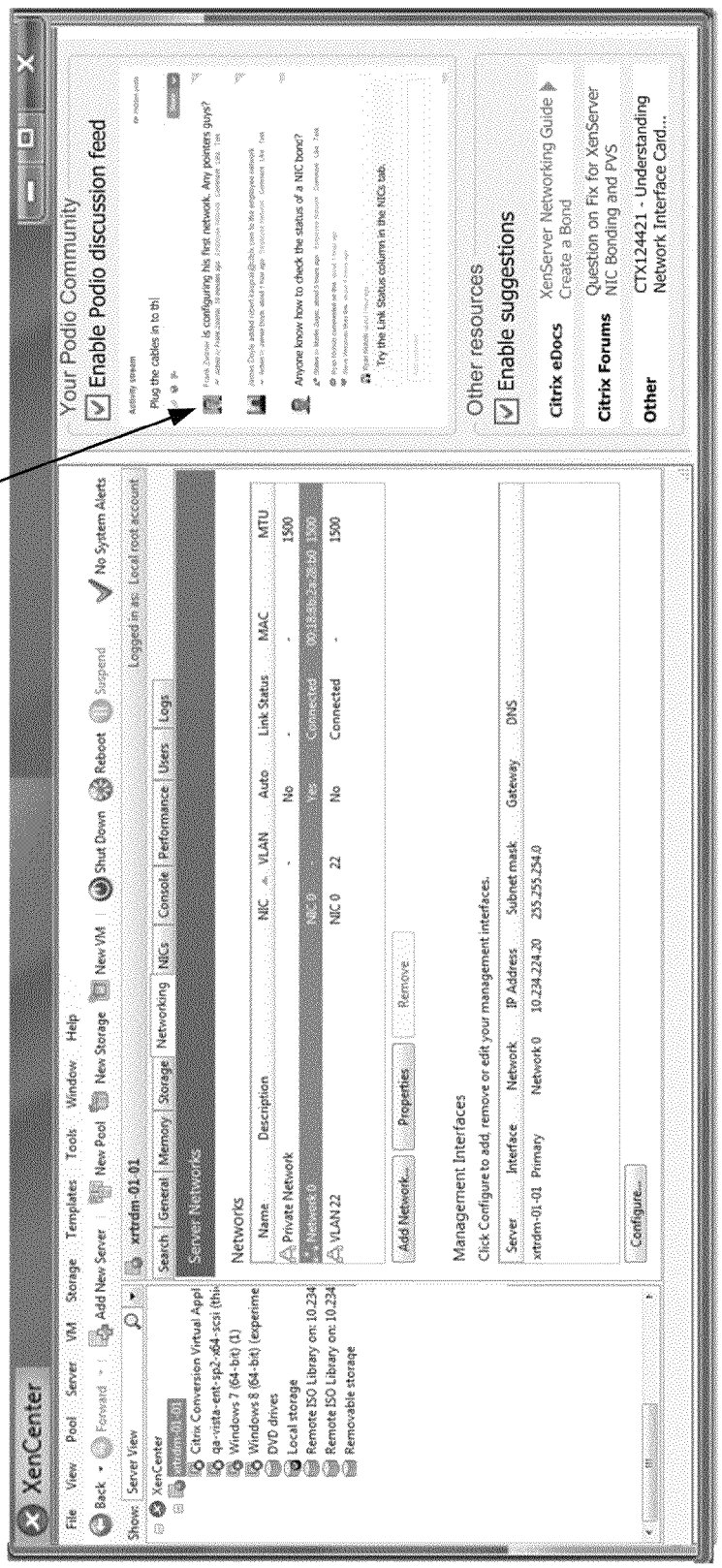

FIG. 20 illustrates an example graphical user interface of a discussion feed in a social media community in accordance with one or more illustrative aspects described herein.

Figure 21:
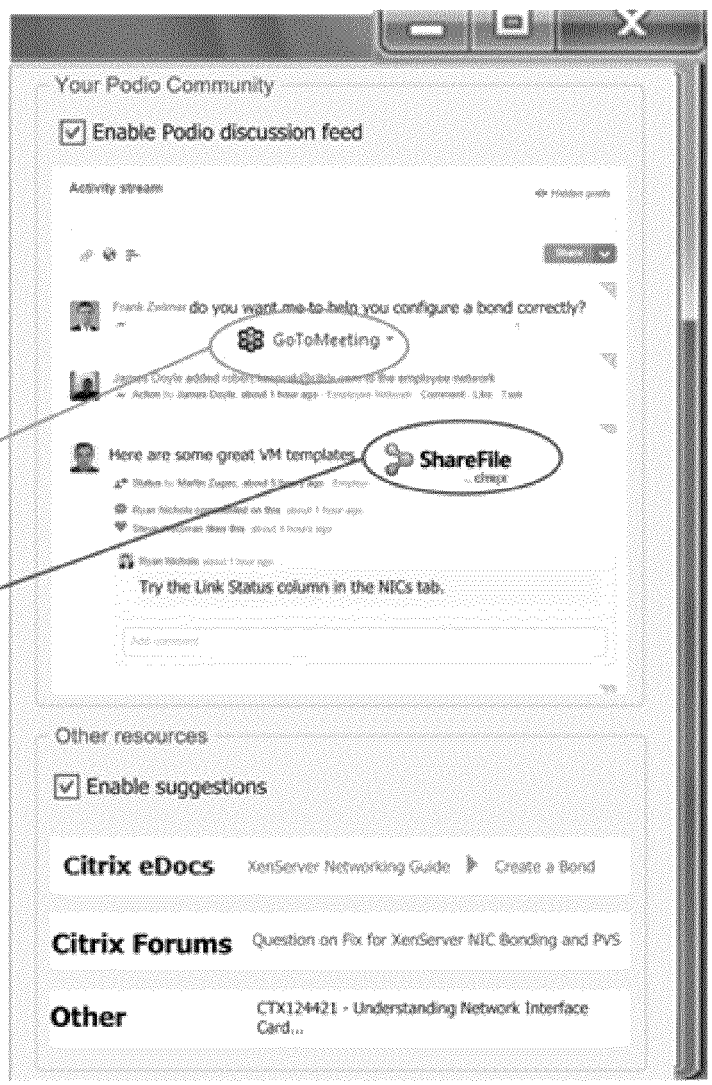

FIG. 21 illustrates an example graphical user interface for displaying links in a discussion feed in accordance with one or more illustrative aspects described herein.

Figure 22:
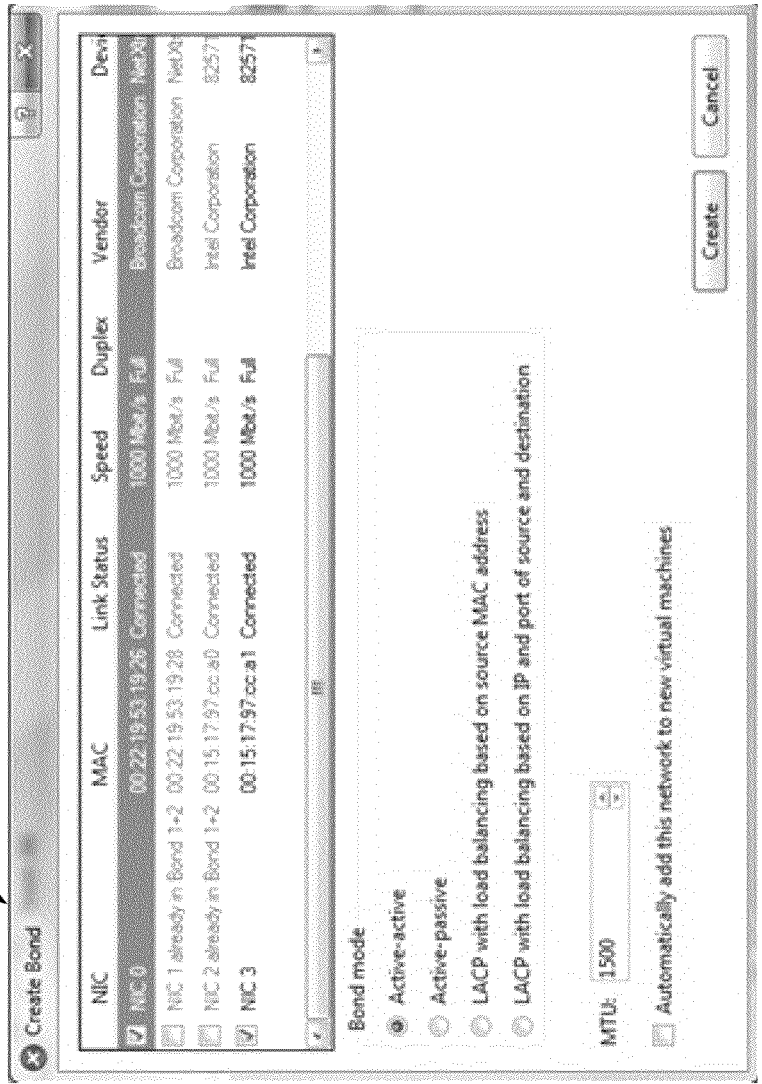

FIG. 22 illustrates an example graphical user interface for creating a Network Interface Card (NIC) bond using an application in accordance with one or more illustrative aspects described herein.

Figure 23:
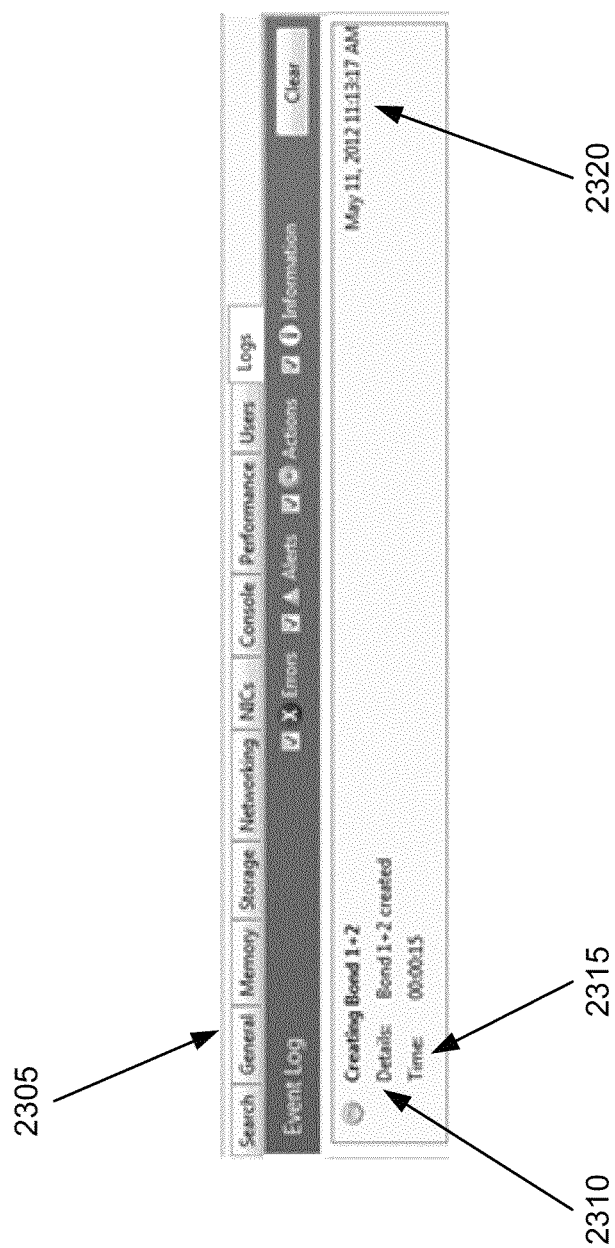

FIG. 23 illustrates an example graphical user interface for generating an event log for the creation of a NIC bond in accordance with one or more illustrative aspects described herein.

Figure 24:
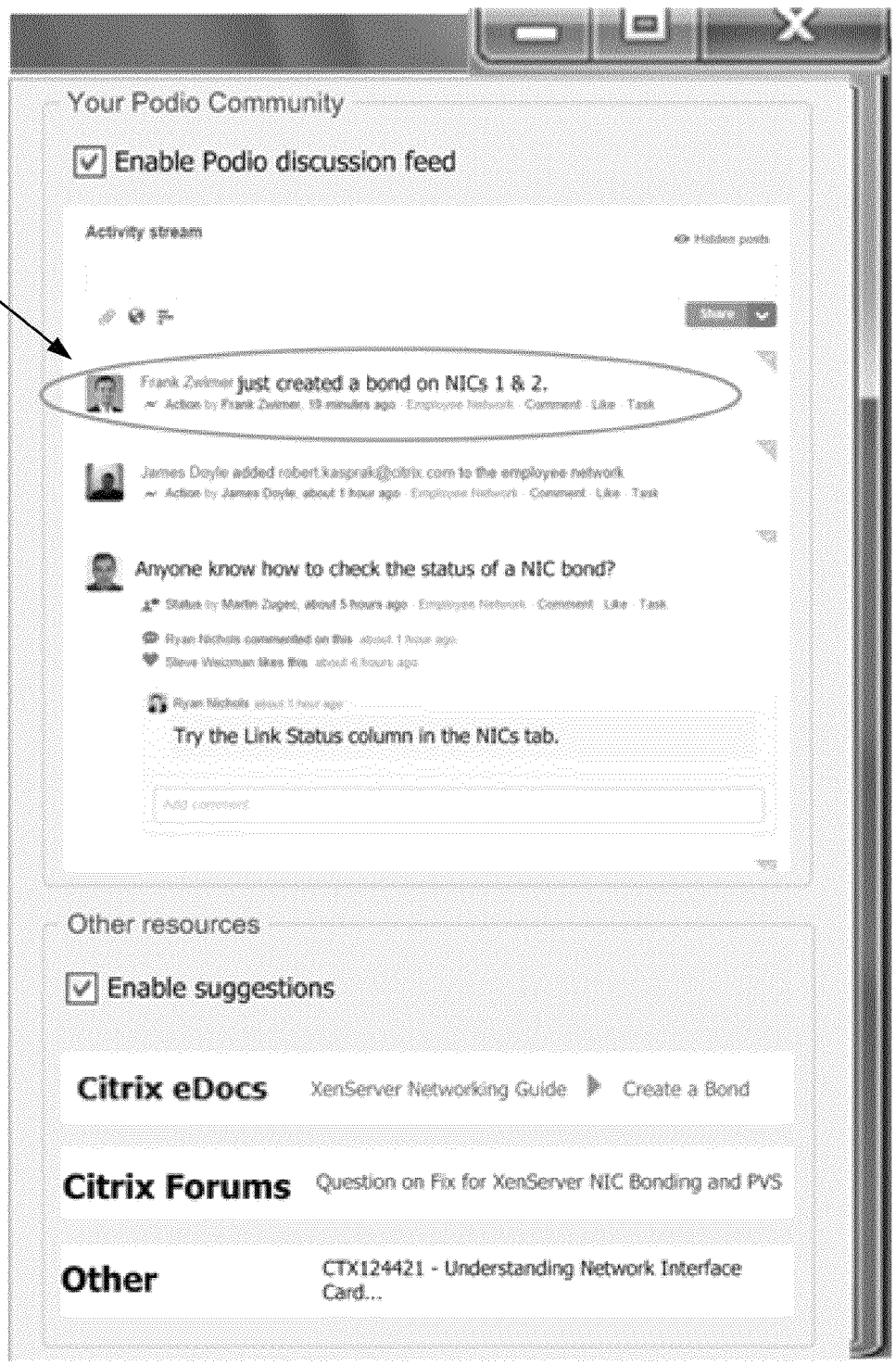

FIG. 24 illustrates an example graphical user interface for displaying creation of a NIC bond in a social media discussion feed in accordance with one or more illustrative aspects described herein.

Figure 25:

FIG. 25 illustrates an example graphical user interface for displaying a discussion feed in a social media application in accordance with one or more illustrative aspects described herein.

Figure 26:
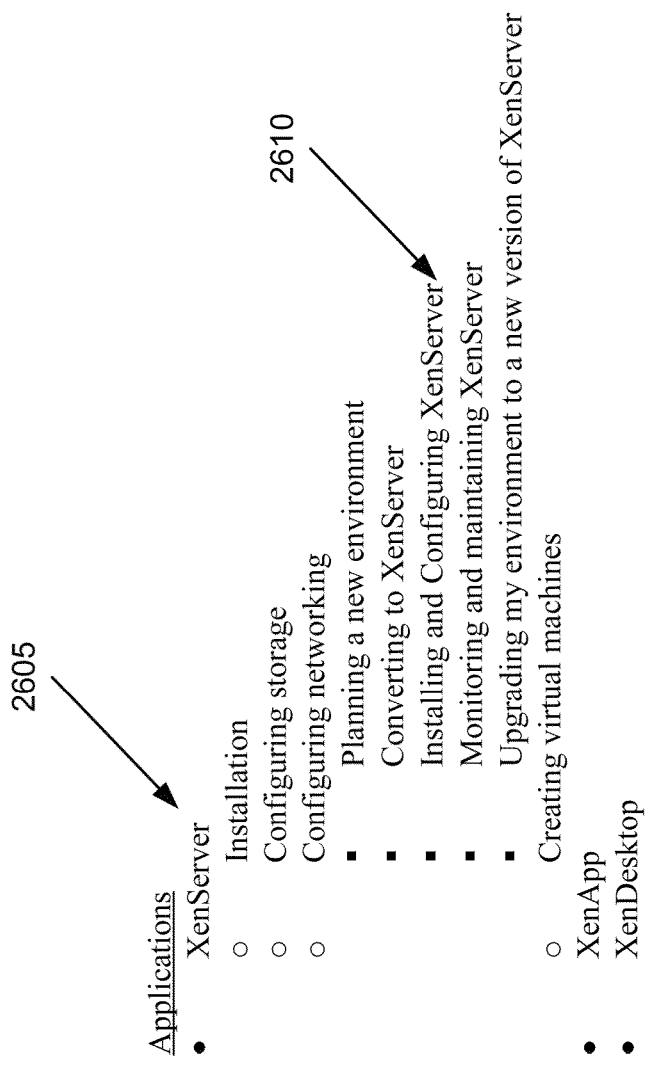

FIG. 26 illustrates an example indexed resource in accordance with one or more illustrative aspects described herein.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope and spirit of the present disclosure.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 illustrates an example block diagram of a generic computing device 101 (e.g., a computer server 106a) in an example computing environment 100 that may be used according to one or more illustrative embodiments of the disclosure. According to one or more aspects, generic computing device 101 may be a server 106a in a single-server or multi-server desktop virtualization system configured to provide virtual machines for client access devices. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 140 (also referred to as client devices). The terminals 140 may be personal computers or servers that include many or all of the elements described above with respect to the generic computing device 101. The network connections depicted in FIG. 1 include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as computer network 130 (e.g., the Internet). It will be appreciated that the network connections shown are illustrative and other means of establishing a communications link between the computers may be used.

Generic computing device 101 and/or terminals 140 may also be mobile terminals (e.g., mobile phones, smartphones, PDAs, notebooks, etc.) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, one or more client devices 140 may be in communication with one or more servers 106a-106n (generally referred to herein as "server(s) 106"). In some embodiments, the computing environment 100 may include an appliance installed between the server(s) 106 and client machine(s) 140. The appliance can manage client/server connections, and in some cases can load balance client connections amongst a plurality of backend servers 106.

The client machine(s) 140 can in some embodiments be referred to as a single client machine 140 or a single group of client machines 140, while server(s) 106 may be referred to as a single server 106 or a single group of servers 106. In some embodiments a single client machine 140 communicates with more than one server 106, while in other embodiments a single server 106 communicates with more than one client machine 140. In yet other embodiments, a single client machine 140 communicates with a single server 106.

A client machine 140 can, in some embodiments, be referenced by any one of the following terms: client machine(s) 140; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In some embodiments, the client machine 140 may be a virtual machine. The virtual machine may be any virtual machine, while in some embodiments the virtual machine may be any virtual machine managed by a hypervisor developed by Citrix Systems, IBM, VMware, or any other hypervisor. In some aspects, the virtual machine may be managed by a hypervisor, while in aspects the virtual machine may be managed by a hypervisor executing on a server 106 or a hypervisor executing on a client 140.

The client machine 140 may execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 140 that displays application output generated by an application remotely executing on a server 106 or other remotely located machine. In these embodiments, the client device 140 can display the application output in an application window, a browser, or other output window. In one example, the application is a desktop, while in other examples the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 106, in some embodiments, executes a remote presentation client or other client or program that uses a thin-client or remote-display protocol to capture display output generated by an application executing on a server 106 and transmits the application display output to a remote client 140. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc.; Riverbed Technology, Inc.; F5 Networks, Inc.; or Juniper Networks, Inc. Some embodiments include a first server 106A that receives requests from a client machine 140, forwards the request to a second server 106n, and responds to the request generated by the client machine 140 with a response from the second server 106n. The first server 106A can acquire an enumeration of applications available to the client machine 140 and well as address information associated with an application server 106 hosting an application identified within the enumeration of applications. The first server 106A can then present a response to the client's request using a web interface, and communicate directly with the client 140 to provide the client 140 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 140 can, in some embodiments, be a client node that seeks access to resources provided by a server 106. In other embodiments, the server 106 may provide clients 140 or client nodes with access to hosted resources. The server 106, in some embodiments, functions as a master node such that it communicates with one or more clients 140 or servers 106. In some embodiments, the master node can identify and provide address information associated with a server 106 hosting a requested application, to one or more clients 140 or servers 106. In still other embodiments, the master node can be a server farm 106, a client 140, a cluster of client nodes 140, or an appliance.

One or more clients 140 and/or one or more servers 106 can transmit data over a network 130 installed between machines and appliances within the computing environment 100. The network 130 can comprise one or more sub-networks, and can be installed between any combination of the clients 140, servers 106, computing machines and appliances included within the computing environment 100. In some embodiments, the network 130 can be: a local-area network (LAN); a metropolitan area network (MAN); a wide area network (WAN); a primary network 104 comprised of multiple sub-networks located between the client machines 140 and the servers 106; a primary public network 130 (e.g., the Internet) with a private sub-network; a primary private network 130 with a public sub-network; or a primary private network 130 with a private sub-network. Still further embodiments include a network 130 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network that includes a wireless link where the wireless link can be an infrared channel or satellite band. The network topology of the network 130 can differ within different embodiments, possible network topologies include: a bus network topology; a star network topology; a ring network topology; a repeater-based network topology; or a tiered-star network topology. Additional embodiments may include a network of mobile telephone networks that use a protocol to communicate among mobile devices, where the protocol can be any one of the following: AMPS; TDMA; CDMA; GSM; GPRS UMTS; or any other protocol able to transmit data among mobile devices.

Illustrated in FIG. 2 is an embodiment of a computing device 200, where the client machine 140 and server 106 illustrated in FIG. 1 may be deployed as and/or executed on any embodiment of the computing device 200 illustrated and described herein. Included within the computing device 200 is a system bus 250 that communicates with the following components: a central processing unit 221; a main memory 222; storage memory 228; an input/output (I/O) controller 223; display devices 224A-224N; an installation device 216; and a network interface 218. In one embodiment, the storage memory 228 includes: an operating system, software routines, and a client agent 220. The I/O controller 223, in some embodiments, is further connected to a keyboard 226, and a pointing device 227. Other embodiments may include an I/O controller 223 connected to more than one input/output device 230A-230N.

FIG. 3 illustrates one embodiment of a computing device 300, where the client machine 140 and server 106 illustrated in FIG. 1 can be deployed as and/or executed on any embodiment of the computing device 300 illustrated and described herein. Included within the computing device 300 is a system bus 350 that communicates with the following components: a bridge 370, and a first I/O device 330a. In another embodiment, the bridge 370 is in further communication with the main central processing unit 321, where the central processing unit 321 can further communicate with a second I/O device 330b, a main memory 322, and a cache memory 340. Included within the central processing unit 321, are I/O ports, a memory port 303, and a main processor.

Embodiments of the computing machine 300 can include a central processing unit 321 characterized by any one of the following component configurations: logic circuits that respond to and process instructions fetched from the main memory unit 322; a microprocessor unit, such as: those manufactured by Intel Corporation; those manufactured by Motorola Corporation; those manufactured by Transmeta Corporation of Santa Clara, Calif.; those manufactured by International Business Machines; a processor such as those manufactured by Advanced Micro Devices; or any other combination of logic circuits. Still other embodiments of the central processing unit 321 may include any combination of the following: a microprocessor, a microcontroller, a central processing unit with a single processing core, a central processing unit with two processing cores, or a central processing unit with more than two processing cores.

While FIG. 3 illustrates a computing device 300 that includes a single central processing unit 321, in some embodiments the computing device 300 can include one or more processing units 321. In these embodiments, the computing device 300 may store and execute firmware or other executable instructions that, when executed, direct the one or more processing units 321 to simultaneously execute instructions or to simultaneously execute instructions on a single piece of data. In other embodiments, the computing device 300 may store and execute firmware or other executable instructions that, when executed, direct the one or more processing units to each execute a section of a group of instructions. For example, each processing unit 321 may be instructed to execute a portion of a program or a particular module within a program.

In some embodiments, the processing unit 321 can include one or more processing cores. For example, the processing unit 321 may have two cores, four cores, eight cores, etc. In some embodiments, the processing unit 321 may comprise one or more parallel processing cores. The processing cores of the processing unit 321, may in some embodiments access available memory as a global address space, or in other embodiments, memory within the computing device 300 can be segmented and assigned to a particular core within the processing unit 321. In some embodiments, the one or more processing cores or processors in the computing device 300 can each access local memory. In still other embodiments, memory within the computing device 300 can be shared amongst one or more processors or processing cores, while other memory can be accessed by particular processors or subsets of processors. In embodiments where the computing device 300 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 300 includes one or more processing units 321, or a processing unit 321 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 300, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 321. In other embodiments, the computing device 300 can include one or more processing units 321, where at least one processing unit 321 is dedicated to processing and rendering graphics.

One embodiment of the computing machine 300 includes a central processing unit 321 that communicates with cache memory 340 via a secondary bus also known as a backside bus, while another embodiment of the computing machine 300 includes a central processing unit 321 that communicates with cache memory via the system bus 350. The local system bus 350 can, in some embodiments, also be used by the central processing unit to communicate with more than one type of I/O device 330a-330n. In some embodiments, the local system bus 350 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 300 include an I/O device 330a-330n that includes a video display 224 that communicates with the central processing unit 321. Still other versions of the computing machine 300 include a processor 321 connected to an I/O device 330a-330n via any one of the following connections: HyperTransport, Rapid I/O, or InfiniBand. Further embodiments of the computing machine 300 include a processor 321 that communicates with one I/O device 330a using a local interconnect bus and a second I/O device 330b using a direct connection.

The computing device 300, in some embodiments, includes a main memory unit 322 and cache memory 340. The cache memory 340 can be any memory type, and in some embodiments can be any one of the following types of memory: SRAM; BSRAM; or EDRAM. Other embodiments include cache memory 340 and a main memory unit 322 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 321 that can access the main memory 322 via: a system bus 350; a memory port 303; or any other connection, bus or port that allows the processor 321 to access memory 322.

One embodiment of the computing device 200/300 provides support for any one of the following installation devices 216: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 220, or any portion of a client agent 220. The computing device 200/300 may further include a storage device 228 that can be either one or more hard disk drives, or one or more redundant arrays of independent disks; where the storage device is configured to store an operating system, software, programs applications, or at least a portion of the client agent 220. A further embodiment of the computing device 200, 300 includes an installation device 216 that is used as the storage device 228.

The computing device 200, 300 may further include a network interface 218 to interface to a Local Area Network (LAN), Wide Area Network (WAN) or the Internet through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 200, 300 includes a network interface 218 able to communicate with additional computing devices 200', 300' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 218 can comprise any one of: a built-in network adapter; a network interface card; a PCM-CIA network card; a card bus network adapter; a wireless network adapter; a USB network adapter; a modem; or any other device suitable for interfacing the computing device 200, 300 to a network capable of communicating and performing the methods and systems described herein.

Embodiments of the computing device 200, 300 include any one of the following I/O devices 230a-230n: a keyboard 226; a pointing device 227; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 223 may in some embodiments connect to multiple I/O devices 230a-230n to control the one or more I/O devices. Some embodiments of the I/O devices 230a-230n may be configured to provide storage or an installation medium 216, while others may provide a universal serial bus (USB) interface for receiving USB storage devices such as the USB Flash Drive line of devices manufactured by Twintech Industry, Inc. Still other embodiments include an I/O device 230 that may be a bridge between the system bus 250 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 200, 300 can connect to multiple display devices 224a-224n, in other embodiments the computing device 100 can connect to a single display device 224, while in still other embodiments the computing device 200, 300 connects to display devices 224a-224n that are the same type or form of display, or to display devices that are different types or forms. Embodiments of the display devices 224a-224n can be supported and enabled by the following: one or multiple I/O devices 230a-230n; the I/O controller 223; a combination of I/O device(s) 230a-230n and the I/O controller 223; any combination of hardware and software able to support a display device 224a-224n; any type and/or form of video adapter, video card, driver, and/or library to interface, communicate, connect or otherwise use the display devices 224a-224n. The computing device 200, 300 may in some embodiments be configured to use one or multiple display devices 224A-224N, these configurations include: having multiple connectors to interface to multiple display devices 224A-224N; having multiple video adapters, with each video adapter connected to one or more of the display devices 224A-224N; having an operating system configured to support multiple displays 224A-224N; using circuits and software included within the computing device 200 to connect to and use multiple display devices 224A-224N; and executing software on the main computing device 200 and multiple secondary computing devices to enable the main computing device 200 to use a secondary computing device's display as a display device 224A-224N for the main computing device 200. Still other embodiments of the computing device 200 may include multiple display devices 224A-224N provided by multiple secondary computing devices and connected to the main computing device 200 via a network.

In some embodiments, the computing machine 200 can execute any operating system, while in other embodiments the computing machine 200 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; WINDOWS VISTA; WINDOWS 7; and WINDOWS 8; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 200 can execute multiple operating systems. For example, the computing machine 200 can execute PARALLELS or another virtualization platform that can execute or manage a virtual machine executing a first operating system, while the computing machine 200 executes a second operating system different from the first operating system.

The computing machine 200 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 200 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

In some embodiments, the computing device 200 may have different processors, operating systems, and input devices consistent with the device. For example, in one embodiment, the computing device 200 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 200 is a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 200 is a mobile device manufactured by Nokia of Finland, or by Sony Ericsson Mobile Communications AB of Lund, Sweden.

In still other embodiments, the computing device 200 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 200 is a smart phone, Pocket PC, Pocket PC Phone, or other handheld mobile device supporting Microsoft Windows Mobile Software. Moreover, the computing device 200 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 200 is a digital audio player. In one of these embodiments, the computing device 200 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 200 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 200 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 200 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats.

In some embodiments, the computing device 200 comprises a combination of devices, such as a mobile phone combined with a digital audio player or portable media player. In one of these embodiments, the computing device 200 is a Motorola RAZR or Motorola ROKR line of combination digital audio players and mobile phones. In another of these embodiments, the computing device 200 is an iPhone smartphone, manufactured by Apple Computer of Cupertino, Calif.

FIGS. 1-3 show a high-level architecture of an illustrative desktop virtualization system. As shown, the desktop virtualization system may be single-server or multi-server system, including at least one virtualization server 106 configured to provide virtual desktops and/or virtual applications to one or more client access devices 140. As used herein, a desktop refers to a graphical environment or space in which one or more applications may be hosted and/or executed. A desktop may include a graphical shell providing a user interface for an instance of an operating system in which local and/or remote applications can be integrated. Applications, as used herein, are programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted). Reference to specific applications, products, and/or systems in this disclosure is for illustrative purposes only, to assist in defining a type or genre that may be used instead of the specifically identified items, and is not meant to be limiting in any respect.

The systems and architectures described above with reference to FIGS. 1-3, as well as other systems and architectures, may be used to implement the functionality described below. In general, integration between a social media application (having a plurality of social media communities that group users by topics of interest, actions performed in applications, user type, user skill level, etc.) and other application programs may be provided. A user may be paired with one or more of the social media communities based on a variety of factors, including applications that the user uses, the user's type (e.g., end-user, administrator, etc.), the user's expertise level (e.g., beginner, advanced, etc.), and/or the type of activities that the user performs in one or more applications. The social media application may include a discussion feed for users in the same community to interact (such as in real-time) with one another and/or a suggestion pane used to provide, to the user, suggestions for resources related to the user's social media communities.

A user's activity in a variety of applications (e.g., enterprise applications, productivity applications, social media applications, content editing applications, etc.) may be monitored. In response to detecting that the user has performed a tracked action in the monitored application, a computing device may perform a variety of steps. A description of the user's action may be posted in a discussion feed of the social media community. Recommendations for resources related to the detected action may be provided to the user, such as in a suggestion window of the social media community. Suggestions may also be generated based on the user's posts in the discussion feed. In some aspects, the user may be paired (or re-paired) with one or more social media communities based on the user's actions.

FIG. 4 illustrates an example method of pairing a user with a social media community in accordance with one or more illustrative aspects described herein. The steps illustrated may be performed by one or more computing device having processor(s) and/or memory. As previously described, the computing devices may be at the same location (e.g., in a client device or in a server device) or distributed across multiple locations (e.g., one computing device in a client and one computing device in a server). With this in mind and for the sake of brevity, the steps illustrated in FIG. 4 will be described as being performed by a computing device. In step 405, the user may log into a social media application account or directly into a social media community of the social media application. The user may input his or her username and/or password to a social media application. Upon authentication, the user may be logged in. FIG. 10 illustrates an example graphical user interface for initiating or logging in to a social media account and/or community in accordance with one or more illustrative aspects described herein. The social media application may include, for example, PODIO, FACEBOOK, TWITTER, or other social media applications. The social media application may be customized or otherwise configured to interact with other applications according to the various features described herein. In the example interface illustrated in FIG. 10, the user may log in to the social media application or a specific community by clicking the "Join" button 1005. In some aspects, the social media application may be configured to execute in a virtual environment, such as XENCENTER, XENDESKTOP, XENAPP, etc. However, the aspects described herein are not limited to virtual environments. The various applications described herein (e.g., enterprise applications, social media applications, productivity applications, etc.) may be implemented on any number of client devices, server devices, across multiple devices in a network (e.g., in a cloud computing environment), etc.

Users in the same social media communities may interact with one another. Social media communities may include open communities, closed communities, and/or a combination thereof. Membership in closed communities may be restricted. For example, a closed community may be created for a company, and the community may be restricted to employees of the company. A closed community may also be created for smaller groups of individuals in the company, such as IT administrators at the company (e.g., XENDESKTOP administrators). Members of closed communities may be restricted in who they may invite to join the community. For example, members of the Company A community may be able to invite employees and contractors of Company A to join the community, but not individuals outside of Company A.

Membership in open communities may be less restrictive than in closed communities. In some embodiments, an open community may be public, and any individual (or group of individuals, such as a company) may be able to join the community. For example, a PODIO community may be created, and any PODIO member may join the PODIO COMMUNITY. Open communities and closed communities may limit membership based on applications used by members (e.g., enterprise applications, productivity applications, multimedia applications, simulation applications, engineering applications, etc.), activities performed in the applications (e.g., configuring a network in XENSERVER, creating and/or publishing an application using XENAPP, creating a NIC bond in XENCENTER, creating a 3D graph in a spreadsheet application, adjusting hue and saturation in a photo editing application, etc.), characteristics of the user (e.g., the user's technical experience), etc., as will be described in further detail in the examples below.

Figure 11:
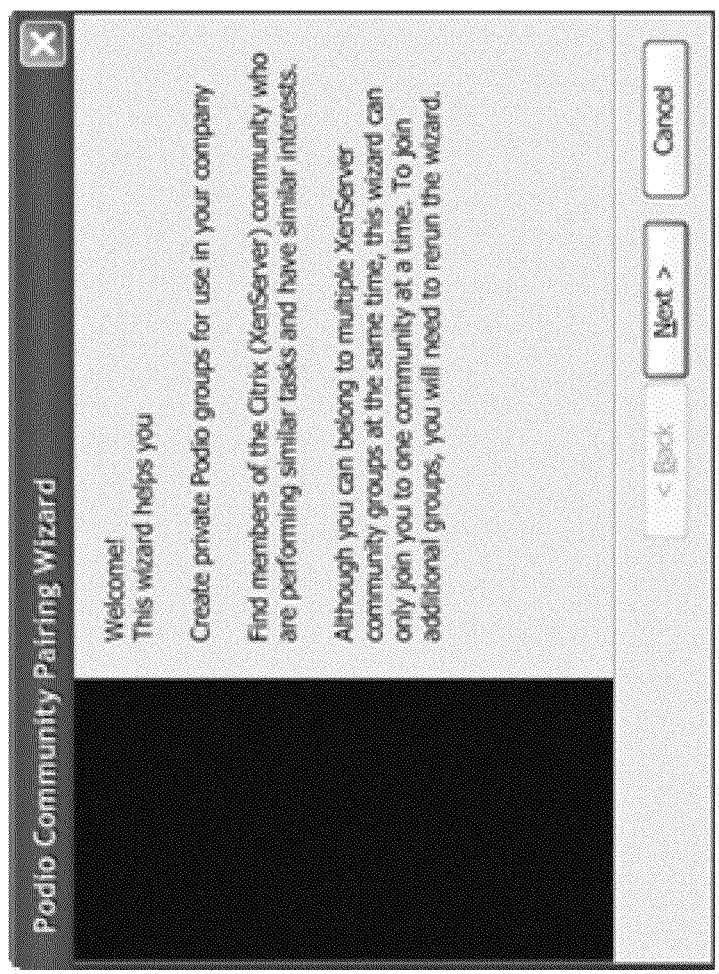

In step 410, a computing device may generate and/or display a community pairing welcome screen. The welcome screen may introduce users to the social media application, including the option to join one or more social media communities based on the characteristics of the user, the application(s) that the user uses, activities (e.g., tasks) that the user performs in the applications, etc. FIG. 11 illustrates an example community pairing welcome screen. In some embodiments, users may be required to rerun the community pairing wizard for each community that the user desires to join as illustrated in FIG. 11. In other embodiments, the community pairing wizard may permit the user to join multiple communities without having to rerun the pairing wizard. As will be described in further detail in the examples below, the user may answer a sequence of questions posed by the community pairing wizard and placed in (or recommended) one or more communities based on the user's answers.

In step 415, the user may select the applications and/or type of applications that the user uses (e.g., is using, plans to user, and/or desires assistance for). Example applications include, but are not limited to, XENCENTER, XENDESKTOP, XENAPP, CITRIX RECEIVER, MICROSOFT WORD, APACHE OPENOFFICE, PHOTOSHOP, ROXIO CREATOR, INTERNET EXPLORER, GOOGLE CHROME, PEACHTREE ACCOUNTING, etc. The computing device may select (in step 450) a community for the user based on the application that the user selects in step 415. The applications may also be categorized by type. For example, XENCENTER, XENDESKTOP, XENAPP, and CITRIX RECEIVER may be categorized as virtualization applications (or enterprise applications); MICROSOFT WORD and APACHE OPENOFFICE may be categorized as word processing applications; PHOTOSHOP and ROXIO CREATOR may be categorized as content editing applications; INTERNET EXPLORER and GOOGLE CHROME may be categorized as web browsers; and PEACHTREE ACCOUNTING may be categorized as an accounting application. The computing device may select (in step 450) a community for the user based on the application type that the user selects in step 415. In some embodiments, the user may drill down from a higher level of generality (e.g., an application type) to a lower level of generality (e.g., a specific application) to select the community to join. For example, a graphical user interface displaying types of applications that may interact with the social media application may be presented to the user (e.g., as a drop-down menu). After the user selects the application type, a list of applications of the selected application type may be presented to the user. For example, a list including PHOTOSHOP and ROXIO CREATOR may be displayed if the user selects a content editing application type.

In step 420, the user may select a user type and/or a user level (e.g., technical expertise level). User types may include, for example, an end-user, a small business user, a reseller, a service provider, an administrator, etc. of a particular application. User levels may include, for example, beginner, intermediate, advanced, whether the user has special training in a particular application or suite of applications (e.g., a Citrix Authorized Learning Center (CALC) for CITRIX products), etc. The computing device may select (in step 450) a community for the user based on the selected user type and/or the user level. For example, if the user selects small business user as the user type, the computing device may pair the user with other small business users in the same community. If the user indicates that she is an advanced user of an application, the computing device may select a community that includes other advanced users of the application. Alternatively, the computing device may attempt to balance the number of beginner, intermediate, and/or advanced users in the same community, so that, for example, advanced users can help beginners. While user levels have been described as beginner, intermediate, and advanced, users' abilities may be rated in other ways (e.g., on a 1-10 scale, with 10 being the most advanced).

Figure 12:
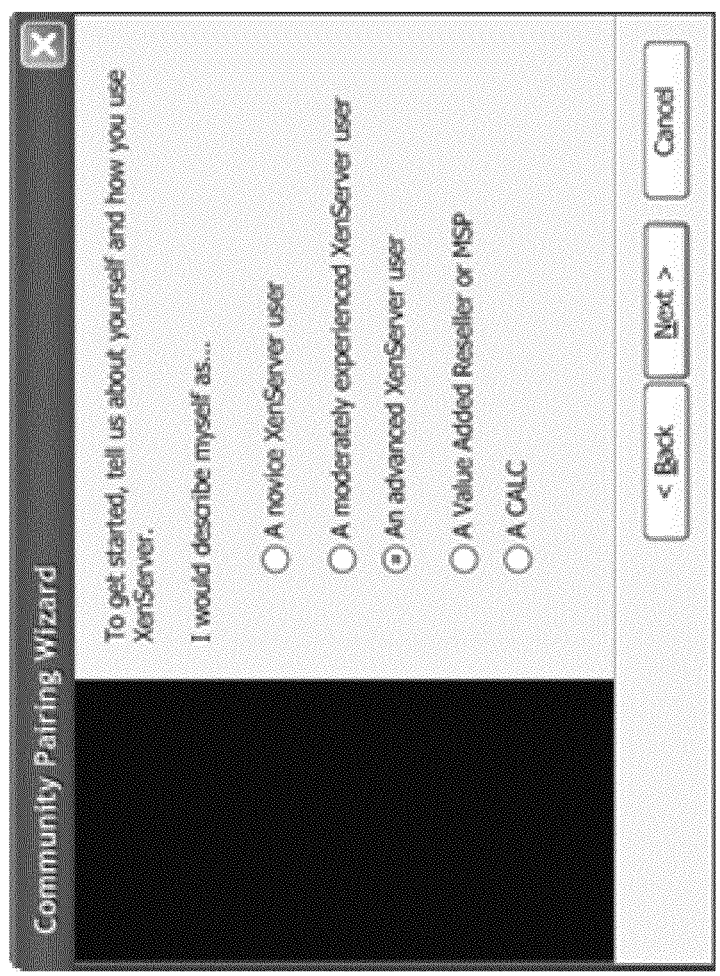

FIG. 12 illustrates an example graphical user interface for selecting a user type and/or level in accordance with one or more illustrative aspects described herein. Options may include, for example, "A novice XenServer user," "A moderately experienced XenServer user," "An advanced XenServer user," "A Value Added Reseller or MSP," "A CALC," and the like. In some embodiments, separate user interfaces may be displayed for user type and level. For example, a user interface for user type (e.g., end-user, small business user, etc.) may first be displayed. After the user makes a user type selection, an interface for user level (e.g., beginner, advanced, CALC, etc.) may be displayed.

In step 425, the user may select the types of activity (e.g., task) the user performs (e.g., is performing, plans to perform, wants to learn how to perform, etc.). Activities may be performed within or using an application such as the application(s) selected in step 415. For example, the user may desire to administer a cloud network, administer an SAP farm, configure a network, troubleshoot problems with an application, create a NIC bond, create 3D graphs in a spreadsheet application, create an equation in a word processing application, adjust the frame rate of videos in video editing software, adjust characteristics of a photograph (e.g., hue, saturation) in photo editing software, perform an installation of applications, configure storage, create virtual machines, etc. These activities are merely examples, and numerous other activities performed within or using applications exist.

In some aspects, activities may be assigned to specific applications. For example, the following activities may be assigned to a word processing application: adjust font, create a table of contents, insert an equation, adjust the page layout, and adjust the margins of the document. After the user selects the word processing application (e.g., in step 415), the types of activities that may be performed in the application may be displayed. A drop-down list, bullet list, a search box, or any other widget may be used to display the types of activities available for the application. For example, a drop-down list may list adjust font, create a table of contents, insert an equation, and adjust the margins of the document for the word processing application. The computing device may select (in step 450) a community for the user based on the user's selected activity type. For example, if the user desires to learn how to adjust the margins of a document, the user may be paired with a community of other users interested in adjusting margins of documents.

In some aspects, users' actions in applications may be categorized into different levels of generalization, and a series of displays may be presented to the user allowing the user to drill down to a certain level of specificity. For example, adjusting a page layout in a word processing application may include adjusting the margins of a document. A first interface may display the activity of adjusting a page layout as one option. If the user selects that option, the next user interface may display other activities associated with adjusting the page layout, including adjusting the margins of a document. Social media communities may be created for each of the activities at any level of specificity.

Figure 13:
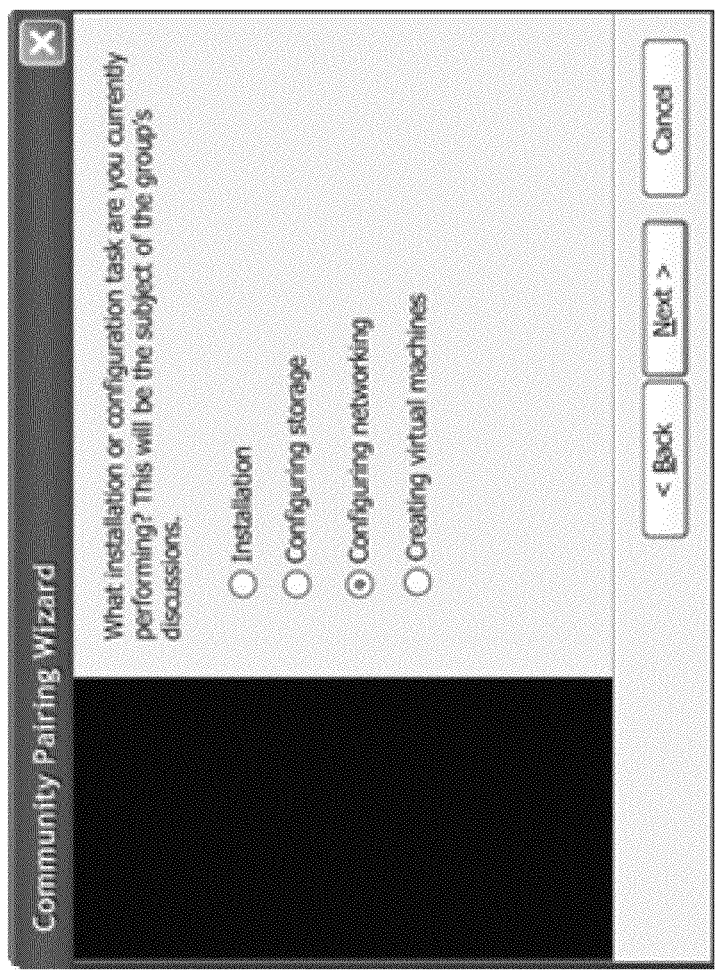
Figure 14:
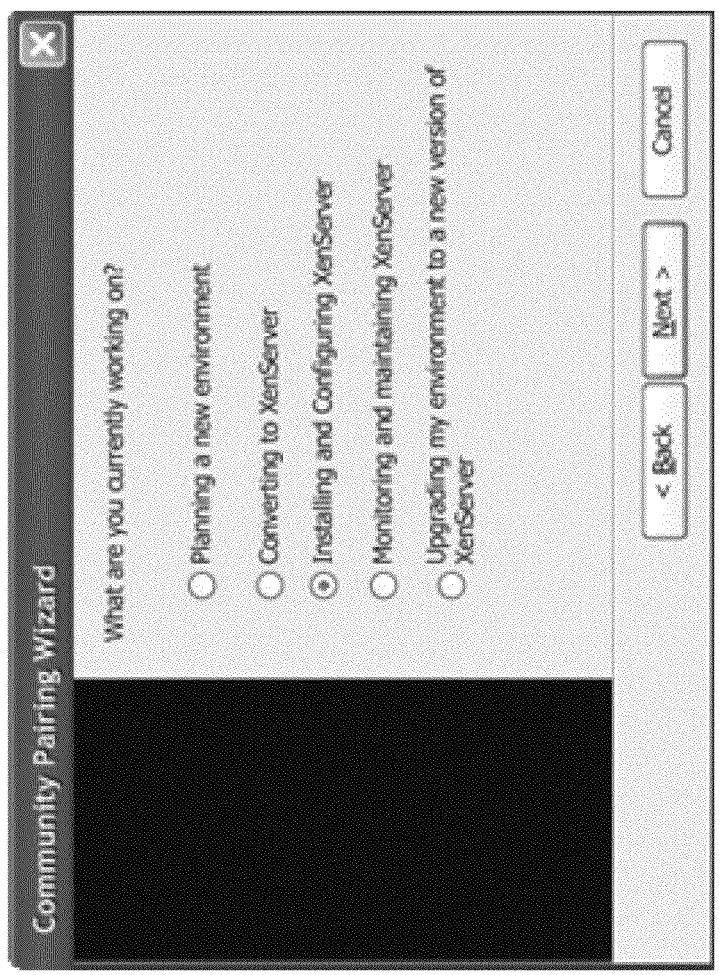

FIGS. 13 and 14 illustrate example graphical user interfaces for selecting one or more activity types in accordance with one or more illustrative aspects described herein. These figures provide an example for a XenServer application. In FIG. 13, the user may be presented with four options for XenServer: "Installation," "Configuring storage," "Configuring networking," and "Creating virtual machines." The user may select the "Configuring networking" option and click "next." In FIG. 14, five options for Configuring networking may be displayed, including "Planning a new environment," "Converting to XenServer," "Installing and Configuring XenServer," "Monitoring and maintaining XenServer," and "Upgrading my environment to a new version of XenServer." Additional levels of activities may be displayed in subsequent user interfaces if they exist. In the present example of FIG. 14, the task of "Installing and Configuring XenServer" may be the lowest level for that branch, and the computing device may pair the user with a community geared towards installing and configuring XenServer after the user clicks next. The computing device may cause the user to join the community, store the community in the user's profile, provide a recommendation for the user to join the community, etc.

In step 430, the computing device may determine whether a community that matches the user's selections in steps 415, 420, and/or 425 already exists. Each community may have associated tags (or other metadata) identifying the intended application, application type, user type, user level, and/or type of activity for the community. Table 1 below presents an example table of tags for three different communities:

TABLE 1

| Community | Application Type | Application | User Type | User Level | Activity Type |
|---|---|---|---|---|---|
| Community 1 | Virtualization | XenServer | Small business user | Beginner | Installing and Configuring XenServer |
| Community 2 | Enterprise | XenCenter | IT administrator | CALC | NIC bond |
| Community 3 | Productivity | Word Processor | End-user | Intermediate | Page layout |

Figure 15:
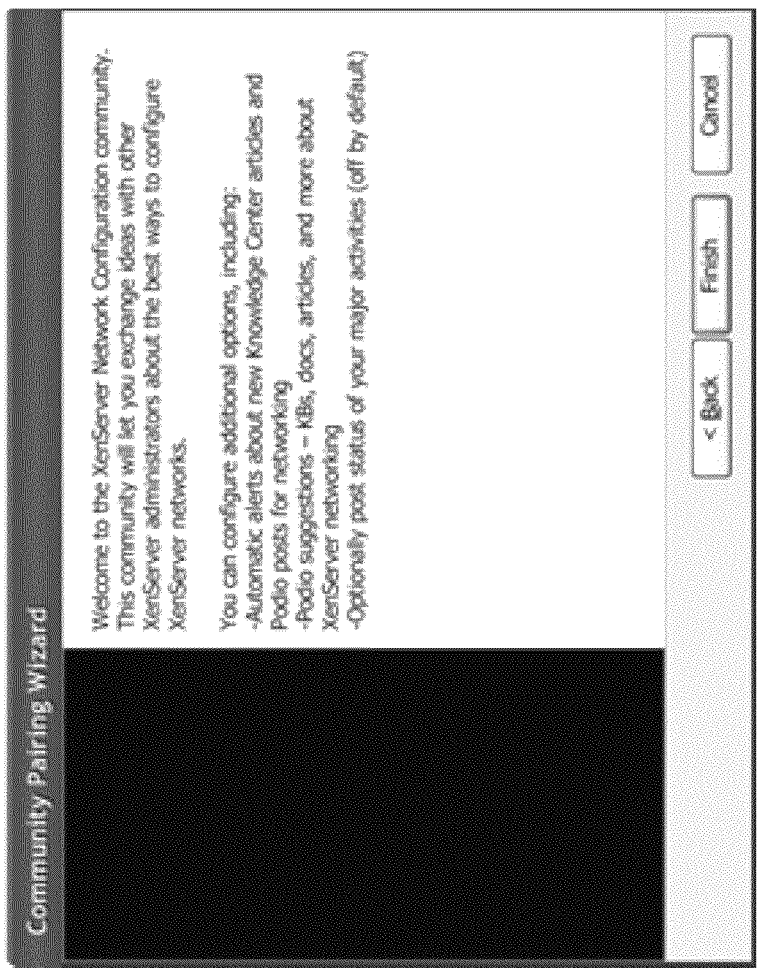

If, in steps 415, 420, and 425, the user selects "Virtualization" as the application type, "XenServer" as the application, "Small business user" as the user type, "Beginner" as the user level, and "Installing and Configuring XenServer" as the activity type, the computing device may determine, in step 430, that Community 1 (which may already exist) exactly matches the user's selections. In step 450, the computing device may cause the user to join Community 1 based on the determination in step 430. The computing device may generate and/or display a recommendation for the user to join Community 1, log the user into Community 1, and/or store an identifier for Community 1 in the user's profile (e.g., for the user to log into in the future). FIG. 15 illustrates an example graphical user interface that may be displayed after the user joins a community (e.g., the XenServer Network Configuration Community). The display may indicate the name of the community (e.g., "XenServer Network Configuration community"), include a description of the community (e.g., "This community will let you exchange ideas with other XenServer administrators . . ."), and/or describe functionalities available to the user in the community (e.g., configure automatic alerts, generate suggestions, post status of activities, etc.).

Figure 16:
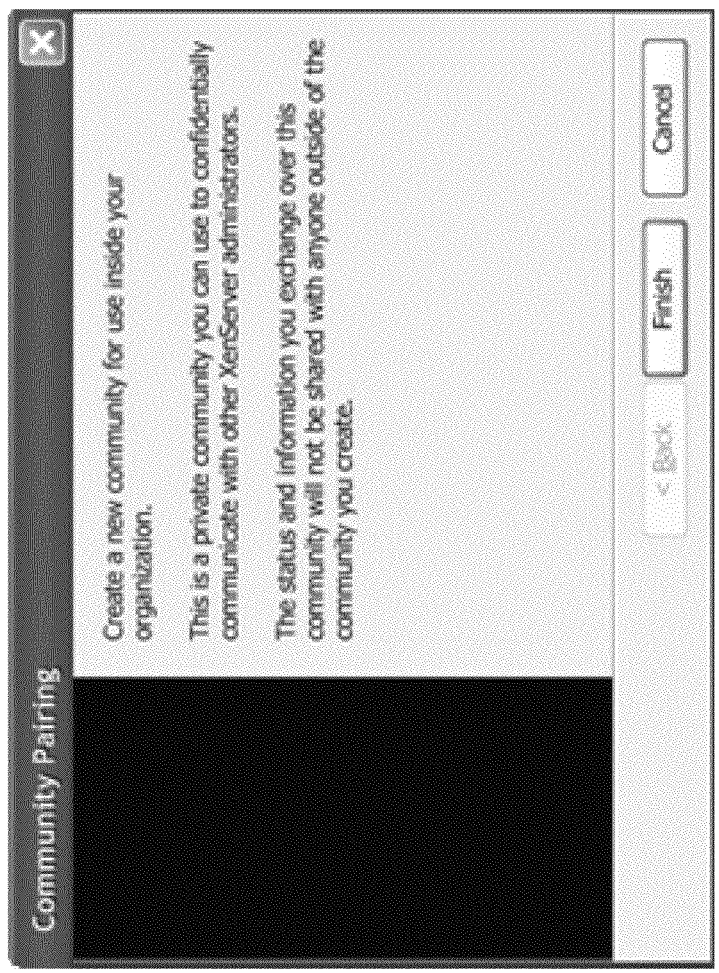

If a social media community that matches the user's selections does not exist (step 430: N), the computing device may determine whether to create a new community in step 435. The user may be presented the option to create a new community that exactly matches the user's selections or to join an existing a community that might not exactly match the user's selections. FIG. 16 illustrates an example graphical user interface that may be displayed if the user (or an administrator) desires to create a new community. Alternatively, whether to create a new community may be based on a number of previous requests for the community or a number of users desiring to use the same application/application type, desiring to perform the same type of activity, and/or of the same user type/level. For example, if a number of users (e.g., 10 users) have indicated interest in the past for a community of Xen-Center end-users, and the current user has indicated the same interest, the computing device may create the community based on a determination that the number of users desiring the community has reached (or exceeded) a predetermined level (e.g., 11 users).

In step 440, the computing device may create the new community based on the user's selections in steps 415, 420, and/or 425. For example, Community 1 with the associated tags illustrated in Table 1 may be created if it does not already exist. If the user does not desire to create a new community, the computing device, in step 445, may attempt to find the next best community based on the user's selections in steps 415, 420, and/or 425. For example, if, in steps 415, 420, and 425, the user selects "Productivity" as the application type, "Word Processor" as the application, "End-user" as the user type, "Beginner" as the user level, and "Page margins" as the activity type, the computing device may determine, in step 445, that Community 3 (which may already exist) is the best match for the user's selections because three out of the five tags (application type, application, and user type) match. In other words, the selection in step 445 may be based on the number of matching categories.

Additionally or alternatively, the computing device may select the next best community from existing communities by generalizing one or more of the user's selections. For example, assume that the user selects "Page margins" as the activity and that the "Page margins" activity is one level below the "Page layout" activity. If a community with "Page layout" as the activity exists (e.g., Community 3), the computing device may select, in step 445, the community having "Page layout" for the activity as the next best community for the user. The computing device may prioritize one or more of the categories over one or more other categories. For example, pairing the user with a community that matches the user's application type and/or application selections may be more important than pairing the user with a community that matches the user's user type and/or user level selections. Therefore, the user may be placed in a first community if only the application category selected by the user matches the application category of the first community, even if both the user type and user level categories selected by the user matches the user type and user level of a second community different from the first community.

In step 455, the computing device may determine whether to add the user to another community. The user may be presented with an option to add another community after the user has joined a first community (e.g., in step 450). If so, the process may return to step 415 to place the user in another community. If not, the community pairing wizard may terminate. In some aspects, data on users' selections (e.g., in steps 415, 420, and/or 425) may be collected, and reports summarizing the most commonly requested communities, application types, applications, user types, user levels, activity types, etc., may be generated.

FIG. 5 illustrates an example method of monitoring a user's application activity in accordance with one or more illustrative aspects described herein. Users may choose whether to have monitoring clients track their activity and/or to otherwise make social media aware of their application activity. In step 505, the computing device may determine whether activity monitoring has been enabled.

In step 510, the computing device may identify the applications to monitor. The user may select which applications to monitor by enabling monitoring for some applications while disabling monitoring for others. Alternatively, the applications currently active (e.g., running) at the user's terminal (or an external terminal in a virtualization or distributed computing environment) may be monitored. For example, if the user is currently running a Word Processor application, the user's activities performed within or using the Word Processor application may be monitored. Additionally or alternatively, applications associated with communities that the user has joined may be monitored. For example, if the user has joined Community 1, applications associated with Community 1 may be monitored (e.g., XenServer, which is associated with Community 1, as illustrated in Table 1 above).

In step 515, one or more monitoring clients (e.g., social media monitoring clients) may be initiated for the applications identified in step 510. In some aspects, a single monitoring client may be used to monitor user activity across a plurality of applications. The monitoring client may receive user activity data via APIs for each of the monitored applications. Alternatively, each application may have its own monitoring client. In some aspects, the monitoring client may comprise a plug-in, applet, or extension to the application. Alternatively, the application itself may include a built-in monitoring client for monitoring user activity. Each monitoring client may communicate with a central manager such as by using the corresponding application's APIs. The central manager may coordinate multiple monitoring clients for multiple applications and also receive event logs from each monitoring client. The central manager may be a software component (or plug-in) of the social media application.

After the monitoring client(s) have been initiated/activated, a user's activity within the monitored application may be tracked. FIG. 17 illustrates an example of a monitoring client (e.g., social media client (SMC)) configured to monitor user activity in the XenServer application in accordance with one or more illustrative aspects described herein. Each user action that the monitoring client tracks may have a corresponding identifier (e.g., a dialog or control ID). For example, in XenServer, a "Networking" tab (e.g., used to configure network settings for XenServer) may have the corresponding identifier "TabPageNetwork." When the user selects the "Networking" tab in XenServer, the monitoring client may detect that the tracked event of tabbing to the Networking tab has occurred (e.g., step 520: Y) and retrieve the corresponding identifier, "TabPageNetwork." FIG. 18 illustrates an example of the monitoring client detecting that the user has selected the "Networking" tab in XenServer and the monitoring client (SMC) finding the corresponding identifier for the action. The monitoring client my write the detected event and/or corresponding identifier to an event log. The monitoring client may also write the time that the user action occurred (e.g., 6:15:17 PM) and/or the duration of the action (e.g., 40 seconds spent in the "Networking" tab) to the event log. Table 2 below illustrates examples of IDs assigned to user activities performed in the XenServer application. Table 2 also identifies communities and keywords corresponding to user actions, which will be described in further detail in the examples below.

In step 610, the computing device may generate a description (e.g., a textual and/or graphical description) of the detected user action based on the information from step 605. For example, the computing device may use the keywords corresponding to the detected action stored in the mapping table (Table 2) to generate the description. FIG. 19 illustrates an example of generating a textual description of user activity or generating a search (as will be described in further detail in the examples below) based on user activity in accordance with one or more illustrative aspects described herein. In the illustrated example, a monitoring client, such as the SMC,

TABLE 2

| User Action | Identifier | Community | Keywords |
|---|---|---|---|
| User selects a "Networking" tab in XenServer | TabPageNetwork | XenServer Networking Community (Private: community populated based on user ID of user currently logged into XenCenter) | Networking, NIC, network, management interface, bond, teaming |
| User selects a "Storage" tab in XenServer | NewVMWizard_Storage Pane | XenServer Storage Community (Private: ABC Company storage engineers) | Storage, NFS, SAN, HBA, SR, Storage Repository |
| User selects an option to upgrade XenServer | RollingUpgradeWizard | XenServer Upgrade to 6.2 Community | XenServer 6.2, upgrade, installation |

In step 525, the monitoring client may send the ID, time of action, duration of action, and/or user identifier (e.g., username) to the central manager, which as previously discussed, may be responsible for coordinating the monitoring of several applications. In some aspects, the monitoring client may send the information in an event log which may be used to record user activities in the application. The central manager may also request user activity information from the application, such as via an API plug-in and/or by trolling event or data log files for each monitored application.

In step 530, the central manager may retrieve a data mapping table (also referred to as a dictionary, such as a context dictionary) that correlates an activity ID to the corresponding user action, one or more social media communities, and/or to one or more keywords, as illustrated in Table 2. Each application may have its own data mapping table. A different mapping table may be used for each user because the mapping table may be partially based on which communities each user has joined. Table 2 comprises an example of part of a data mapping table for XenServer. Additionally or alternatively, a monitoring client for a particular application may retrieve the data mapping table in step 530. The data mapping table may be used for various purposes, including displaying the user's actions in step 535 (FIG. 6), generating suggestions for resources for the user based on the user's activity in step 540 (FIG. 7), and/or pairing or re-pairing the user with one or more social media communities based on the user's activity in step 545 (FIG. 9), as will be described in further detail in the examples below.

FIG. 6 illustrates an example method of generating textual descriptions of user actions in accordance with one or more illustrative aspects described herein. In step 605, a computing device may determine, for a detected user action, the user that performed the action, the application that the action took place in and/or that was used to perform the action, the time that the action occurred (or duration of the action), and/or any other information associated with the detected action. As previously noted, this information may have been recorded in an event log of an application.

and/or a central manager may retrieve keywords associated with the detected activity to generate the description. Table 3 illustrates examples of generated textual descriptions.

TABLE 3

| | |
|---|---|
| 1 | Frank just created a bond on NICs 1 and 2. |
| 2 | Frnk1234 is configuring a network using XenCenter (6:05:15 PM). Any pointers? |
| 3 | Frank created a 3D graph in the Spreadsheet Application at 11:17 AM PST. Does anyone need help creating a 3D graph? |

Example textual description 1 in Table 3 includes the user's name ("Frank"), the time the action took place ("just"), the user action taken ("created a bond on NICs 1 and 2"). The terms used for the user action taken may be retrieved from the data mapping table. For example and with reference to Table 2 above, the computing device may use the keywords "NIC" and "bond" from the keywords associated with the action of the user selecting a "Networking" tab (or creating a NIC bond) and to generate the textual description.

Example textual description 2 in Table 3 includes the user's username ("Frnk1234"), the time the action took place ("(6:05:15 PM)"), the user action taken ("configuring a network"), and the application used to perform the action ("XenCenter"). The textual description of the user's action may be taken from the mapping table. For example, the mapping table may associate the keywords "configuring" and "network" or the phrase "configuring a network" with the user action. Textual description 2 may also include supplemental text, such as a question ("Any pointers?"). The computing device may generate (or retrieve) such a question if the user is determined to be currently performing the action or if the user is detected to have started performing the action recently (e.g., within a predetermined time period, such as 10 seconds, from the current time). By including this supplemental phrase, the computing device may solicit, for the user, help from other members of the same social media community. The supplemental text/questions may also be listed in the data mapping table (e.g., Table 2).

Example textual description 3 in Table 3 includes the user's name ("Frank"), the time the action took place ("11:17 AM PST"), the user action taken ("created a 3D graph"), the application used to perform the action ("Spreadsheet Application"), and a supplemental question ("Does anyone need help creating a 3D graph?"). By including this supplemental question and based on a determination that the user successfully created a 3D graph in the Spreadsheet Application, the computing device may offer the user's assistance to other members of the same social media community to create a 3D graph.

In step 615, the description generated in step 610 may be displayed in a discussion feed window of one or more of the user's social media communities. The data mapping table may identify which social media communities to post the description. With reference to Table 2, if the detected action is that the user selected a "Networking" tab in XenServer, the posting may be made to the discussion feed of the XenServer Networking Community, which is identified in Table 2 as corresponding to the activity. If the detected action is that the user has selected an option to upgrade XenServer, the posting may be made to the discussion feed for the XenServer Upgrade to 6.2 Community. If more than one community is associated with the detected user action, the description may be posted to each of those communities or a subset of those communities. FIG. 20 illustrates an example graphical user interface of a discussion feed in a social media community in accordance with one or more illustrative aspects described herein. The textual description of user activity 2005 may be posted in the discussion feed, such as the discussion feed window of a particular PODIO community. Other types of feeds (e.g., a web feed, such as an RSS feed) may be used to publish the description of the activity. Other external social media programs, such as FACEBOOK, may also be used to publish user activities.

In step 615, additional information, such as links, may be posted with the textual description. FIG. 21 illustrates an example graphical user interface for displaying links in a discussion feed in accordance with one or more illustrative aspects described herein. The discussion feed may display a link 2105 used to request an online meeting, such as a web conference, with the user (e.g., a GoToMeeting, GoToWebinar, GoToTraining, GoToAssist, GoToMyPC, HiDef Corporate, etc.). By clicking on the link, an online conference room including web tools, audio functionalities, and/or video functionalities may be created to enable users in the social media community to meet online, discuss how to perform an activity identified in the post, etc. For example and as illustrated in FIG. 21, Frank may post a question "do you want me to help you configure a bond correctly?" with a link to join and/or request the creation of a web conference for Frank to help other users in the social media community configure NIC bonds in XenServer.

The discussion feed may display a link 2110 that enables users in the community to share and/or synchronize documents over a network (e.g., via ShareFile, StorageZones, cloud storage services, etc.). By clicking on the link, multiple users in the social media community may access and/or modify the same documents. For example and as illustrated in FIG. 21, Bob may post the advice "Here are some great VM templates" with a link to access the VM templates. Other types of links may be included with the discussion feed post. For example, a link to send a private message to the user may be included with the post. This may enable users to discuss topics one-on-one. Comments responding to discussion feed posts may also be displayed.

An example of detecting that a user is creating a Network Interface Card (NIC) bond between NICs 1 and 2 and publishing the activity to a discussion feed of a social media community will be described with reference to FIGS. 22-25. FIG. 22 illustrates an example graphical user interface 2205 for creating a NIC bond. As illustrated, the user may have created a NIC bond between NIC 1 and NIC 2.

FIG. 23 illustrates an example event or data log for the creation of a NIC bond. A monitoring client for the XenServer application may have detected, in step 520 of FIG. 5, that the user created a NIC bond between NIC 1 and NIC 2 and created the corresponding event log in FIG. 23. The event log may identify the action taken by the user 2310 (e.g., "Bond 1+2 created"), the amount of time it took the user to complete the action 2315 (e.g., "00:00:15"), the date and/or time that the user initiated or completed the action 2320 (e.g., "May 11, 2012 11:13:17 AM"), and other information (e.g., application name, username, etc.). The monitoring client may transmit this information to a central manager in step 525 of FIG. 5.

A computing device may generate a textual description of the action performed by Frank and display the description in a discussion feed window of a Community associated with the user and/or action (e.g., "Frank just created a bond on NICs 1 and 2."), as illustrated in FIG. 24 (reference 2405). As previously discussed, various links (e.g., an online meeting link, a private message link, etc.) may be posted automatically or on demand next to the textual description.

By publishing user activity, many benefits may be achieved. Other users in the social media community may help the user perform tasks. The user may help other users in the community perform tasks. Users may collaborate on tasks. Users in the same community may also analyze and/or verify other users' activities (e.g., community auditing). Users may raise flags if another user has done something wrong. For example, if too many NIC bonds exist in a network, and Frank creates another NIC bond between NICs 1 and 2, other users may post messages in the discussion feed (or directly message Frank), to remove the bond.

FIG. 7 illustrates an example method of searching resources for information based on user activity in an application in accordance with one or more illustrative aspects described herein. Resources may be related to an activity the user is performing or has performed and/or the social media community that the user is part of Resource suggestions may be enabled or disabled in the social media application or community. For example, FIG. 25 illustrates an example graphical user interface for displaying a discussion feed and/or suggestions in a community. A user may enable suggestions by checking the "Enable suggestions" box 2505.

With reference to FIG. 7, in step 705, a computing device may identify keywords associated with the user action. The computing device may use a data mapping table storing the detected user action to identify the corresponding keywords. For example and with reference to Table 2 above, the user action may be a selection of an option to upgrade XenServer. The computing device may determine, in step 705 and based on the data mapping table, that the keywords "XenServer 6.2," "upgrade," and "installation" correspond to the detected user activity. As another example, the keywords "Storage," "NFS," "SAN," "HBA," "SR," and "Storage Repository" may correspond to the action of the user selecting a "Storage" tab in XenServer (Table 2).

In step 710, the computing device may identify resources to search based on the user's activity. Resources may include general network-based (e.g., Internet) resources, including information from search engines (e.g., GOOGLE search, BING search, YAHOO search, blogs, etc.). Resources may also include information unique to each application or suite of applications. For example, a database of "help" information tailored to the XenServer application may exist. The XenServer help information may also be available at a software developer's or service provider's website (e.g., CITRIX.com for XenServer documentation). Resources available at these websites may also include knowledge bases (KBs), product documentation for applications (e.g., CITRIX eDocs), product forums that users and administrators may use, and any other resources available for the application.

In step 715, the computing device may generate searches for information related to the application and/or detected user activity using the resources identified in step 710. In some aspects, the computing device may generate search terms or strings based on the keywords associated with the detected action. For example, if a monitoring client determines that a user has selected an option to upgrade XenServer, the computing device may use the terms "XenServer 6.2," "upgrade," "installation," or a combination thereof to generate search terms or strings for the identified resources (see Table 2).

The application and/or user action may also have one or more corresponding indexed resources. FIG. 26 illustrates an example indexed resource for the virtualization applications XenServer, XenApp, and XenDesktop in accordance with one or more illustrative aspects described herein. If the user performs a general action in XenServer, the computing device may generate a search for resources in the "XenServer" database 2605. For example, the computing device may create a search string to search the "XenServer" database 2605. Alternatively (and as will be discussed in further detail below), a link to the XenServer database 2605 may be displayed in the suggestions pane. If the user performs an action related to installing and configuring XenServer, the computing device may generate a search for resources in the "Installing and Configuring XenServer" database 2610, which may be indexed at a lower level than the "XenServer" database 2605. For example, the computing device may create a search string to search the "Installing and Configuring XenServer" database 2610. Instead of generating a search string (and as will be discussed in further detail below), a link to the "Installing and Configuring XenServer" database 2605 may be displayed in the suggestions pane.

In step 720, results from the search(es) performed in step 715 may be displayed in the social media community, such as within the discussion feed or in a suggestions pane. FIG. 25 illustrates example search results 2515, including a result from CITRIX eDocs, a result from CITRIX Forums, and other results. The search results may be selectable by the user and lead the user to the identified resource (e.g., a website, a help page, an indexed listing of topics, etc.).

In some embodiments, the user might not immediately be provided with search results upon detecting the user action. For example, a computing device may generate and/or display search results to the user based on a determination that the user has spent a predetermined amount of time in a particular topic area. If the user has navigated to a "Networking" tab in XenServer, and has remained in the tab for more than a predetermined time period of 30 seconds, a computing device may perform one or more of the steps illustrated in FIG. 7 to provide search results related to the "Networking" tab in XenServer. On the other hand, if the user has only spent 25 seconds in the "Networking" tab, search results might not be provided to the user. Searches may also be generated and/or displayed to the user based on the frequency with which the user performs a particular action. In other words, the search results might not be provided after the user performs the action the first time, but might be provided only after the user performs the action more than a predetermined number of times (e.g., 2 times, 5 times, etc.). For example, if the user has navigated to the "Networking" tab once, a search for resources might not be performed. However, the search might be performed (and results displayed) after the user navigates to the "Networking" tab a second time. The active application (e.g., XenServer) or the social media application (e.g., PODIO) may include a manual search functionality that allows the user to perform searches for resources. Results from these searches may be displayed in the suggestions pane.

FIG. 8 illustrates an example method of searching resources for information based on user discussion posts in accordance with one or more illustrative aspects described herein. Users in social media communities may enter posts into discussion feeds. For example, FIG. 25 illustrates an example post 2510 entered by a user ("Plug the cables in to the cables into the NICs bef . . . "). In step 805, a computing device may determine whether the user has posted something in the discussion pane of the social media community.

If a user has posted in the discussion pane (step 805: Y), the computing device, in step 810, may identify keywords and/or corresponding user actions from the post. In particular, the computing device may determine whether any of the terms used in the post match keywords in one or more data mapping tables for various software applications. Once matching keywords are found, the computing device may correlate the keywords with one or more user actions. For example, in the post illustrated in FIG. 25 ("Plug the cables in to the cables into the NICs bef . . . "), the computing device may determine that the phrase "NICs" is included in a data mapping table for the XenServer application, as illustrated in Table 2 above. In particular, the computing device may determine that the user is interested in performing an action in the "Networking" tab in XenServer, which corresponds to the keyword "NIC" included in Table 2.

In step 815, the computing device may identify resources to search. Step 815 may substantially correspond to step 710 previously described. In step 820, the computing device may generate searches in the one or more resources identified in step 815. Step 820 may substantially correspond to step 715 previously described. For example, the computing device may generate search strings using keywords associated with the user activity and/or locate an indexed reference, such as an indexed help page, associated with the activity or application. In step 825, the results of the searches performed in step 820 may be displayed in a window of the social media community, such as in the discussion feed or a suggestions pane. Step 825 may substantially correspond to step 720 previously described.

FIG. 9 illustrates an example method of pairing a user with a social media community based on user activity in accordance with one or more illustrative aspects described herein. In particular, the user may be paired (or re-paired) with one or more social media communities after the user performs a monitored action. The steps illustrated in FIG. 9 may be performed in response to detecting that a user has performed a particular action having a corresponding ID, as was previously described with respect to FIG. 5.

In step 905, a computing device may identify one or more communities that correspond to the activity ID detected by the monitoring client. The correspondence between user actions and communities may be stored in a data mapping table. With reference to Table 2 above, assume that the monitoring client detected that the user selected a "Storage" tab in XenServer, which has a corresponding ID of "NewVMWizard_StoragePane." In step 905, the computing device may determine that the "XenServer Storage Community" corresponds to the detected ID.

In step 910, the computing device may determine whether the user has joined the community identified in step 905. If the user has not joined the identified community, the computing device, in step 915, may display an option for the user to join the identified community. For example, a link to join the identified community along with a prompt, such as "You may be interested in joining the XenServer Storage Community," may be displayed to the user. In step 920, the computing device may determine whether the user has selected the option to join the identified community. If so, the computing device, in step 925, may pair the user with the identified community (e.g., the XenServer Storage Community). In some embodiments, steps 915 and/or 920 may be optional, and the computing device might automatically pair the user with the identified community (instead of asking the user if the user is interested in joining the community).

In some embodiments, if no communities have been associated with the detected user action, the computing device may create a new community for the user action substantially similar to the creation described with respect to step 440 and/or place the user in the next best community described with respect to step 445.

In the example steps described with respect to FIGS. 4 and 9, the user may be paired (or re-paired) based on a community pairing wizard (e.g., FIG. 4) and/or based on the user's actions in monitored applications (e.g., FIG. 9). For example, the user may initially join a first social media community based on various selections made by the user in the community pairing wizard (FIG. 4). Subsequently, the user may perform an action in an application monitored by a monitoring client. In response to detecting the action, the social media application may cause the user to join a second social media community that corresponds to the detected action. The second social media community may be different from the first social media community. The social media application may cause the user to become members of both the first and second communities (e.g., maintain the user in the first social media community while the user joins the second social media community). Alternatively, the application may cause the user to leave the first social media community by switching the user from the first social media community to the second social media community in response to detecting the user activity. The user may be paired and/or re-paired with different communities any number of times in accordance with the concepts described herein.

In some embodiments, the user might not immediately be paired with a new social media community after detecting the action by the user. For example, the user may be paired with a new community based on a determination that the user has spent a predetermined amount of time in a particular topic area. If, for example, the user has navigated to a "Networking" tab in XenServer, and has remained in the tab for more than a predetermined time period (e.g., 30 seconds), a computing device may perform one or more of the steps illustrated in FIG. 9 to pair the user with a community related to the "Networking" tab in XenServer (e.g., the XenServer Networking Community). On the other hand, the user might not be re-paired if the user only spends 25 seconds in the "Networking" tab. The user may also be paired based on the frequency with which the user performs a particular action. In other words, the pairing might not be performed after the user performs the action the first time, but the user might only be paired after the user performs the action more than a predetermined number of times (e.g., 2 times, 5 times, etc.). For example, if the user has navigated to the "Networking" tab once, the user might not be paired with a new community. However, the user might be paired with the new community after the user navigates to the "Networking" tab a second time. The active application (e.g., XenServer) or the social media application (e.g., PODIO) may include a manual search functionality that allows the user to perform various searches for resources and other documentation. Based on these searches (e.g., the text or other keywords used in the search), the user may be paired with a community corresponding to one or more keywords used in the search (e.g., based on a data mapping table, such as Table 2).

Although example embodiments are described above, the various features and steps may be combined, divided, omitted, and/or augmented in any desired manner, and other steps may be added, depending on the specific recommendation process desired. The scope of this patent should only be defined by the claims that follow.

What is claimed is:

1. A method of pairing a user to a social media community, comprising:
   initiating a monitoring client to monitor user activity in an application;
   detecting, by the monitoring client, a user action taken in the application;
   determining, by a computing device, a first social media community corresponding to the detected user action, wherein the first social media community is classified among a plurality of social media communities; and
   pairing the user with the first social media community corresponding to the detected user action.

2. The method of claim 1, wherein:
   detecting the user action comprises determining the presence of an identifier assigned to the user action, and
   determining the first social media community comprises comparing the identifier to a data mapping table for the application, wherein the data mapping table is configured to correlate the identifier with the user action.

3. The method of claim 1, wherein the monitoring client comprises a plug-in to the application.

4. The method of claim 1, wherein determining the first social media community comprises:
   determining that the first social media community does not exist; and
   creating the first social media community in response to determining that the first social media community does not exist,
   wherein pairing the user with the first social media community comprises pairing the user with the created first social media community.

5. The method of claim 1, wherein pairing the user with the first social media community comprises:
   switching the user from a second social media community to the first social media community, wherein the second social media community is different from the first social media community.

6. The method of claim 5, wherein prior to pairing the user with the first social media community, the method further comprises:
   generating a plurality of community pairing display windows configured to navigate the user to join at least one of the plurality of social media communities;
   receiving at least one selection of an application, application type, user type, user level, and activity type desired by the user;
   determining the second social media community based on the at least one selection; and pairing the user with the second social media community.

7. The method of claim 6, further comprising:
creating the second social media community in response to determining that the second social media community does not exist,
wherein pairing the user with the second social media community comprises pairing the user with the created second social media community.

8. The method of claim 6, wherein receiving the at least one selection comprises receiving at least two selections of an application, application type, user type, user level, and activity type, the method further comprising:
in response to determining that the second social media community does not exist, pairing the user with a third social media community based on at least one of the selections matching the third social media community and at least one of the selections not matching the third social media community.

9. The method of claim 1, wherein the user is paired with a second social media community different from the first social media community, the method further comprising:
maintaining the user's pairing with the second social media community while pairing the user with the first social media community.

10. One or more non-transitory computer-readable media storing computer-readable instructions that, when executed by a computing device, configure the computing device to:
initiate a monitoring client to monitor user activity in an application;
detect, by the monitoring client, a user action taken in the application;
determine a first social media community corresponding to the detected user action, wherein the first social media community is classified among a plurality of social media communities; and
pair the user with the first social media community corresponding to the detected user action.

11. The one or more non-transitory computer-readable media of claim 10, wherein determining the first social media community comprises:
determining that the first social media community does not exist; and
creating the first social media community in response to determining that the first social media community does not exist,
wherein pairing the user with the first social media community comprises pairing the user with the created first social media community.

12. The one or more non-transitory computer-readable media of claim 10, wherein pairing the user with the first social media community comprises:
switching the user from a second social media community to the first social media community, wherein the second social media community is different from the first social media community.

13. The one or more non-transitory computer-readable media of claim 12, wherein prior to pairing the user with the first social media community, the one or more non-transitory computer-readable media store additional computer-readable instructions that, when executed by the computing device, configure the computing device to:
generate a plurality of community pairing display windows configured to navigate the user to join at least one of the plurality of social media communities;
receive at least one selection of an application, application type, user type, user level, and activity type desired by the user;
determine the second social media community based on the at least one selection; and
pair the user with the second social media community.

14. The one or more non-transitory computer-readable media of claim 13 storing additional computer-readable instructions that, when executed by the computing device, configure the computing device to:
create the second social media community in response to determining that the second social media community does not exist,
wherein pairing the user with the second social media community comprises pairing the user with the created second social media community.

15. The one or more non-transitory computer-readable media of claim 13, wherein receiving the at least one selection comprises receiving at least two selections of an application, application type, user type, user level, and activity type, the one or more non-transitory computer-readable media storing additional computer-readable instructions that, when executed by the computing device, configure the computing device to:
in response to determining that the second social media community does not exist, pair the user with a third social media community based on at least one of the selections matching the third social media community and at least one of the selections not matching the third social media community.

16. The one or more non-transitory computer-readable media of claim 10, wherein the user is paired with a second social media community different from the first social media community, the one or more non-transitory computer-readable media storing additional computer-readable instructions that, when executed by the computing device, configure the computing device to:
maintain the user's pairing with the second social media community while pairing the user with the first social media community.

17. The one or more non-transitory computer-readable media of claim 10, wherein the monitoring client comprises a plug-in to the application.

18. A device comprising:
a processor; and
memory storing computer-readable instructions that, when executed by the processor, cause the device to:
initiate a monitoring client to monitor user activity in an application;
detect, by the monitoring client, a user action taken in the application;
determine a first social media community corresponding to the detected user action, wherein the first social media community is classified among a plurality of social media communities; and
pair the user with the first social media community corresponding to the detected user action.

19. The device of claim 18, wherein:
detecting the user action comprises determining the presence of an identifier assigned to the user action, and
determining the first social media community comprises comparing the identifier to a data mapping table for the application, wherein the data mapping table is configured to correlate the identifier with the user action.

20. The device of claim 18, wherein the monitoring client comprises a plug-in to the application.

* * * * *